United States Patent
Barnett et al.

(10) Patent No.: US 9,185,837 B2
(45) Date of Patent: Nov. 17, 2015

(54) PULL-TYPE CROP HARVESTING MACHINE TRANSPORT SYSTEM ACTUATED AT A PREDETERMINED ANGLE OF THE HITCH

(71) Applicants: MacDon Industries Ltd., Winnipeg (CA); Maschinenfabrik Bernard Krone GmbH, Spelle (DE)

(72) Inventors: Neil Gordon Barnett, Winnipeg (CA); Ricky Chan, Winnipeg (CA); Geoffrey U. Snider, Winnipeg (CA); Andreas Afting, Emsburen (DE)

(73) Assignees: Macdon Industries Ltd., Winnipeg, MB (CA); Maschinenfabrik Bernard Krone GmbH, Spelle (DE)

( * ) Notice: Subject to any disclaimer, the term of this patent is extended or adjusted under 35 U.S.C. 154(b) by 99 days.

(21) Appl. No.: 13/870,363

(22) Filed: Apr. 25, 2013

(65) Prior Publication Data

US 2013/0284469 A1    Oct. 31, 2013

Related U.S. Application Data

(60) Provisional application No. 61/638,864, filed on Apr. 26, 2012.

(51) Int. Cl.
*A01B 73/00*      (2006.01)
*A01D 67/00*      (2006.01)
(Continued)

(52) U.S. Cl.
CPC .............. *A01B 73/005* (2013.01); *A01B 63/002* (2013.01); *A01B 63/16* (2013.01); *A01B 63/22* (2013.01); *A01B 73/00* (2013.01); *A01D 43/00* (2013.01); *A01D 43/06* (2013.01);
(Continued)

(58) Field of Classification Search
CPC ...... A01B 63/22; A01B 63/32; A01B 73/048; A01B 73/065; A01B 69/003; A01B 69/004; A01B 73/00; A01B 73/005; A01B 73/067; A01B 34/64; A01B 67/005
USPC ............ 172/452, 625, 383, 386; 56/228, 15.2
See application file for complete search history.

(56) References Cited

U.S. PATENT DOCUMENTS 2,779,261 A    1/1957  Northcote et al.
2,833,105 A *  5/1958  Naery ............................. 56/228
(Continued)

FOREIGN PATENT DOCUMENTS

EP    0064115    11/1982
EP    0628237    12/1994
(Continued)

*Primary Examiner* — Árpád Fábián-Kovács
(74) *Attorney, Agent, or Firm* — Adrian D. Battison; Ade & Company Inc.

(57) ABSTRACT

A pull-type crop engaging machine such as a rotary mower comprises a frame mounted on transversely spaced field ground wheels for movement with a hitch arm extending to a tractor and a transport assembly attached behind the frame for moving downwardly to a transport position so that in the transport position the hitch arm extends from one end of the frame generally in the transverse direction for towing the machine in the transverse direction. The transport includes a transport ground wheel which acts to raise the frame to pass underneath the crop engaging system to support the machine on the wheel, on a second wheel behind the frame and on the hitch. The movement of the hitch and the wheel is connected and started at a position of the hitch so that the machine remains balanced. A shield behind the frame includes a portion which moves with the transport wheel.

20 Claims, 16 Drawing Sheets

(51) Int. Cl.
*A01B 63/16* (2006.01)
*A01B 63/00* (2006.01)
*A01B 63/22* (2006.01)
*A01D 43/00* (2006.01)
*A01D 43/06* (2006.01)
*A01B 69/00* (2006.01)

(52) U.S. Cl.
CPC ............ *A01D 67/005* (2013.01); *A01B 69/003* (2013.01); *A01D 67/00* (2013.01)

(56) References Cited

U.S. PATENT DOCUMENTS

| | | | |
|---|---|---|---|
| 3,288,480 A | 11/1966 | Calkins et al. | |
| 3,721,461 A * | 3/1973 | Nelsen et al. | 172/1 |
| 3,732,932 A | 5/1973 | Taube | |
| 3,734,195 A | 5/1973 | Cantral | |
| 3,797,207 A | 3/1974 | Sawyer et al. | |
| 3,832,837 A * | 9/1974 | Burkhart et al. | 56/218 |
| 3,919,831 A * | 11/1975 | Halls et al. | 56/228 |
| 4,009,554 A * | 3/1977 | Adee | 56/1 |
| 4,099,364 A | 7/1978 | Kanengieter et al. | |
| 4,119,329 A | 10/1978 | Smith | |
| 4,177,625 A | 12/1979 | Knight et al. | |
| 4,177,627 A | 12/1979 | Cicci | |
| 4,193,458 A | 3/1980 | Meinert et al. | |
| 4,223,741 A | 9/1980 | Blumhardt | |
| 4,233,803 A | 11/1980 | Davis et al. | |
| 4,435,948 A | 3/1984 | Jennings | |
| 4,442,662 A * | 4/1984 | Jennings | 56/228 |
| 4,460,193 A * | 7/1984 | Dietz et al. | 56/228 |
| 4,506,904 A * | 3/1985 | Kinzenbaw | 172/248 |
| 4,552,375 A * | 11/1985 | Kinzenbaw | 172/248 |
| 4,558,560 A * | 12/1985 | Koch | 56/228 |
| 4,625,809 A * | 12/1986 | Moynihan | 172/178 |
| 4,662,161 A | 5/1987 | Patterson | |
| 4,682,462 A * | 7/1987 | Johnson, Sr. | 56/228 |
| 4,700,784 A | 10/1987 | Wiebe et al. | |
| 4,723,401 A | 2/1988 | Webster et al. | |
| 4,765,639 A * | 8/1988 | Murray | 172/625 |
| 4,817,730 A | 4/1989 | Winter | |
| 4,821,806 A | 4/1989 | Winter | |
| 4,825,958 A | 5/1989 | Kelderman | |
| 4,846,283 A | 7/1989 | Batcheller | |
| 4,871,028 A * | 10/1989 | Murray | 172/248 |
| 4,934,131 A * | 6/1990 | Frisk et al. | 56/192 |
| 4,986,064 A * | 1/1991 | Ermacora | 56/228 |
| 4,991,383 A * | 2/1991 | Ermarcora | 56/14.9 |
| 5,000,268 A | 3/1991 | Zimmerman | |
| 5,044,447 A | 9/1991 | Langeoire | |
| 5,060,462 A * | 10/1991 | Helfer et al. | 56/14.9 |
| 5,136,828 A * | 8/1992 | Ermacora | 56/10.2 R |
| 5,191,942 A | 3/1993 | Bussiere | |
| 5,199,250 A * | 4/1993 | Ermacora et al. | 56/15.2 |
| 5,255,756 A | 10/1993 | Follmer et al. | |
| 5,357,737 A | 10/1994 | Ermacora et al. | |
| 5,558,163 A | 9/1996 | Hollstein | |
| 5,566,535 A | 10/1996 | Pruitt | |
| 5,642,607 A * | 7/1997 | Stephenson et al. | 56/15.1 |
| 5,806,291 A | 9/1998 | Lehman et al. | |
| 5,901,537 A * | 5/1999 | Walch et al. | 56/15.2 |
| 5,975,829 A | 11/1999 | Walters | |
| 6,105,679 A | 8/2000 | Schubert et al. | |
| 6,152,240 A | 11/2000 | Nonhoff et al. | |
| 6,189,306 B1 * | 2/2001 | Walch | 56/15.1 |
| 6,209,297 B1 | 4/2001 | Yeomans et al. | |
| 6,220,365 B1 | 4/2001 | Birchmier | |
| 6,238,170 B1 * | 5/2001 | Pingry et al. | 414/550 |
| 6,260,629 B1 * | 7/2001 | Toth | 172/282 |
| 6,336,313 B1 | 1/2002 | Bonnewitz | |
| 6,360,516 B1 | 3/2002 | Harkcom | |
| 6,408,950 B1 | 6/2002 | Shoup | |
| 6,532,723 B2 | 3/2003 | Delmas | |
| 6,655,118 B1 | 12/2003 | Thompson et al. | |
| 6,666,010 B2 | 12/2003 | Beaufort | |
| 6,758,284 B2 | 7/2004 | Myers | |
| 7,162,854 B2 * | 1/2007 | Yeomans et al. | 56/14.9 |
| 7,207,166 B2 * | 4/2007 | Stephenson | 56/15.2 |
| 7,337,599 B2 | 3/2008 | Wilhelm | |
| 7,347,277 B2 | 3/2008 | Enns et al. | |
| 7,596,935 B2 | 10/2009 | Bollinger et al. | |
| 7,926,249 B1 | 4/2011 | Cook | |
| 8,025,312 B1 | 9/2011 | Honas et al. | |
| 8,112,977 B2 | 2/2012 | Priepke | |
| 8,166,740 B2 | 5/2012 | Eubanks et al. | |
| 8,235,133 B2 * | 8/2012 | Friggstad | 172/386 |
| 8,256,198 B2 | 9/2012 | Thompson | |
| 8,458,997 B2 | 6/2013 | Walch et al. | |
| 8,910,726 B2 | 12/2014 | Lammerant et al. | |
| 2002/0017089 A1* | 2/2002 | Faivre | 56/15.5 |
| 2008/0120956 A1 | 5/2008 | Gradoz et al. | |
| 2009/0272551 A1 | 11/2009 | Thompson et al. | |
| 2011/0197561 A1 | 8/2011 | Priepke | |
| 2011/0290515 A1 | 12/2011 | Yuen | |
| 2012/0180878 A1 | 7/2012 | Greenwood et al. | |
| 2012/0186216 A1 | 7/2012 | Vaske et al. | |
| 2013/0081830 A1 | 4/2013 | Tuttle et al. | |
| 2013/0186657 A1* | 7/2013 | Kormann et al. | 172/1 |

FOREIGN PATENT DOCUMENTS

| | | |
|---|---|---|
| EP | 0823985 | 2/1998 |
| FR | 2567710 | 1/1986 |
| GB | 2232055 | 12/1990 |

\* cited by examiner

PULL-TYPE CROP HARVESTING MACHINE TRANSPORT SYSTEM ACTUATED AT A PREDETERMINED ANGLE OF THE HITCH

This application claims the benefit under 35 USC 119(e) of Provisional application 61/638,864 filed Apr. 26, 2012.

This invention relates to a pull-type crop machine of the type including a header carried on a frame to be towed behind a tractor and particularly to an improvement relating to an arrangement by which the machine can be moved to a transport condition while remaining connected to the towing tractor. The machine can include a cutter bar and converging components for forming a swath or may include other crop engaging elements such as a swath turner or merger.

BACKGROUND OF THE INVENTION

Pull-type harvesting machines are typically towed from the tractor by a hitch arm which requires to be adjusted in angle relative to the frame of the machine for fine steering movements and more coarse movement to the transport position.

Some machines are required to follow the tractor only to one side and thus include a hitch arm which is located at one end of the machine. In others in which the present invention is particularly effective, the hitch arm to the tractor extends from the frame over the header to a hitch coupling and can be swung by an operating cylinder from one side of the header to the other so that the header can be located in echelon with the tractor to one side or generally symmetrically to the other side.

Pull-type machines of this type are well known and there are many different examples manufactured by a number of different companies.

The present invention relates primarily to disk headers, otherwise known as rotary mowers, where the design is particularly applicable. However other types of headers can use the same arrangement, including sickle bar headers, where typically a reel is provided to control movement of the crop into the cutting knife.

The present invention relates primarily to headers which use a center tongue or hitch arm which can pivot to either side of a center line, including to a position at right angles to the center line for transport. A center pivot machine uses a swing cylinder to steer the machine from one field position to another and the maximum allowed swing is controlled either by the cylinder stops or separate mechanical stops between the hitch and rear frame. During field operation the operator generally steers from one stop to the other so does not need to fine tune his position very much using the cylinders. Swing angles are generally of the order of or slightly less than 45 degree range either side of the center line to help maintain machine stability.

However other types of headers can use the same arrangement, including headers where the hitch arm is located at one end and is generally fixed during normal operation but can pivot to the position at right angles to the center line for transport.

Disk headers which utilize as the cutting system a plurality of spaced disks across the width of the header with each disk rotating about a respective vertical axis are known and widely used.

Disk headers include a support frame with a main rear beam carried on a pair of spaced ground wheels with the cutter bar and conditioning system suspended from the frame.

Often such disk headers are relatively narrow in field width, such as 12 feet or 16 feet, so that transport has been carried out simply by moving the center tongue to a straight ahead position so that the header is pulled directly behind the tractor. In many jurisdictions this has been accepted even though the width of the header is still greater than the acceptable road width. However legal requirements for trailing machines on the roads are becoming more strict and users are becoming more aware of the risks of trailing over-width equipment. Also there is an increasing requirement to provide machines of greater width which is likely to become more important when the transport problem is suitable solved.

Some manufacturers therefore provide a trailer which allows the header to be carried on the trailer in a direction transverse to the forward field direction bearing in mind that the transverse width of the header is typically an acceptable transport width. However trailers are undesirable in that the trailer forms extra equipment which much be purchased, in that the trailer must be towed from place to place and therefore may often be in the wrong place or not immediately available thus increasing transport times.

Attempts have been made therefore often in Europe where transport requirements are more strict to provide transport wheels on the header which can be deployed to the ground allowing the header to be towed on the transport wheels in the transverse direction.

SUMMARY OF THE INVENTION

It is one object of the invention to provide header of the above type with a transport system carried on the header which allows the header to be quickly and conveniently moved to the transport position.

According to one aspect of the invention there is provided a pull-type crop engaging machine for towed movement by a tractor comprising:

a frame mounted on at least one field ground wheel for forward movement during field operation across ground carrying a crop;

a crop engaging system mounted in a transverse direction across a front of the frame so that the frame carries the crop engaging system in the forward direction generally at right angles to the transverse direction into the crop;

a hitch arm extending from the frame to a forward end of the hitch arm arranged for attachment to a hitch connector of a tractor by which the frame is towed in the forward direction across the ground;

wherein the hitch arm is movable by a steering system to different angles relative to the frame between a first end field position inclined forwardly and outwardly toward a first end of the frame and a second end field position inclined forwardly and outwardly toward a second end of the frame;

wherein the hitch arm is movable to a transport position in which the hitch arm extends from one end of the frame generally in the transverse direction for towing the machine in the transverse direction;

at least one transport ground wheel attached to the frame for engaging the ground and supporting the frame during transport;

and a deployment apparatus for deploying movement of said at least one transport ground wheel;

said deployment apparatus including components responsive to positioning of the hitch arm at a predetermined intermediate angle to the frame located between said first and second field positions and an actuating apparatus for deploying said movement;

wherein said actuating apparatus is arranged to be initiated when said hitch arm is at said intermediate angle.

Preferably the transport ground wheel is movable between a first position in which the transport ground wheel is raised from the ground for field operation and a second position in which the transport ground wheel is in contact with the ground.

Preferably the deployment apparatus is arranged for simultaneous movement relative to the frame of the transport ground wheel and of the hitch arm to the transport position.

Preferably the intermediate angle is arranged such that the machine remains balanced on the hitch arm and the field ground wheel, remains balanced on said hitch arm and the transport ground wheel when the transport wheel is deployed with the hitch arm at the intermediate angle and remains balanced on the hitch arm and the transport ground wheel as the hitch arm is moved toward the transport position.

Preferably the hitch arm is moved by the deployment apparatus to a position spaced from the transport position.

Preferably the hitch arm is moved from the position spaced from the transport position to the transport position by the steering system.

Preferably there is provided a lift system for raising and lowering the header and wherein the movement by the deployment apparatus of the hitch arm from the position spaced from the transport position to the transport position acts to deactivate the deployment apparatus and activate the lift system.

Preferably the movement by the deployment apparatus of the hitch arm from the position spaced from the transport position to the transport position acts to activate a latch for the hitch arm to the frame.

Preferably there is provided a mechanical stop between the hitch arm and frame and the hitch arm is moved from the position spaced from the transport position to the transport position by the steering system until hitting the stop.

Preferably there is provided a latch between the hitch arm and the frame and the hitch arm is latched to the rear frame at the stop.

Preferably there is provided a lift system for raising and lowering the header and there is provided a latch between the hitch arm and the frame and actuation of the latch and the lift system is effected simultaneously so that operating the latch to release the hitch arm causes lifting of the header.

Preferably the actuating apparatus is arranged to be initiated only when the hitch arm is within a predetermined range of angles at the intermediate angle.

Preferably the components responsive to the positioning of the hitch arm comprise a switch operable to an actuating position of the deployment apparatus when mechanically engaged by an element carried on the hitch arm.

Preferably the switch and the hitch arm are arranged so as to maintain the switch in the actuating position as the hitch arm moves from the predetermined intermediate angle toward the transport position.

Preferably the switch is movable with the hitch arm so as to maintain the switch in the actuating position as the hitch arm moves from the predetermined intermediate angle toward the transport position. 7

Preferably the switch is a hydraulic valve operable to select one of two hydraulic circuits to enable operation of a hydraulic cylinder of said actuating apparatus.

Preferably the switch is a hydraulic valve operable to select operation of said actuating apparatus and disconnect operation of another function of the machine.

Preferably the components responsive to positioning of the hitch arm comprise at least one position sensor for detecting when the hitch arm is within a predetermined range of angles at the intermediate angle and for providing an electrical signal in response thereto.

Preferably the frame and the cutter system are raised by downward movement of the transport ground wheel or wheels. However other lifting systems can be used such as separate jacks or the field ground wheels.

Preferably the transport ground assembly is mounted between the field ground wheels. However it can be mounted at one end to rotate around the end of the frame or over the frame.

Preferably there are two transport ground wheels which are carried on a common sub-frame assembly attached to the frame. However the transport wheel may include only one additional wheel with one or more of the field ground wheels acting in the transport mode.

Preferably in the transport or roading position, one transport ground wheel is at a position on one side of a line in the roading direction containing the center of gravity of the machine and another ground wheel used for transport is at a position on the other side of the line in the transverse direction containing the center of gravity of the machine. To achieve this, preferably the transport ground wheel is moved to the position on the side of the line by passing underneath said cutter system. However the wheel which moves forwardly to carry the load can be located at one end and move around the end or may pass over the header to its forward position.

In the preferred arrangement described hereinafter there are two transport ground wheels carried on a common sub-frame assembly attached to the frame where the sub-frame assembly is mounted for pivotal movement about a horizontal axis to lower the transport ground wheels to the ground and lift the field ground wheels and for pivotal movement about an upstanding axis to rotate said one of the transport ground wheels to said position on said forward side of the line.

Preferably the frame includes a main rear beam extending across a rear of the frame and the transport assembly is carried on the main rear beam. However other frame arrangements may be provided which do not rely on a single main beam. The intention is that the transport assembly is attached to the existing frame structure as a separate attachable optional component and that when attached it is carried upwardly and rearwardly of the frame so as to avoid interfering with crop harvesting. The transport assembly can also be formed integrally with the header structure instead of being an option.

In the preferred arrangement described hereinafter the transport assembly includes a generally L-shaped member defining a post and beam at right angles with the upstanding post mounted at its upper end for said pivotal movement about a horizontal axis and said pivotal movement about said upstanding axis with said one of said transport ground wheels at the end of the beam for movement underneath the cutter system.

Preferably in the transport position one of the transport ground wheels is at a position on a forward side of a line in the transverse direction containing the center of gravity of the machine and another of the ground wheels used in transport is at a position on a rearward side of the line in the transverse direction containing the center of gravity of the machine and there is provided an actuation arrangement for moving the hitch arm and the transport ground wheel between the field position and the transport position arranged to move the hitch arm from the field position to the transport position and to move said one of the transport ground wheels to said position on said forward side of said line in simultaneous operation such that the machine remains balanced on said transport ground wheels and said hitch arm while the hitch arm remains attached to the tractor during said movement to said transport position. The actuation arrangement which causes the simultaneous action is preferably a mechanical link as this is a simple construction. However it may be carried out with electrical or hydraulic control of separate actuators.

In the preferred arrangement described hereinafter the mechanical link includes a swivel mounting which is connected to the frame and carries the movable transport ground wheels and the actuation arrangement includes an actuator in the form of a cylinder for moving the swivel mounting and a link between the hitch arm and the swivel mounting for connecting the movement of the hitch arm and the ground wheel.

Preferably the swivel mounting moves in a horizontal plane parallel to the movement of the hitch arm and the transport ground wheel is mounted on the swivel mounting for the required downward movement about the horizontal axis.

Preferably the swivel mounting is actuated by a cylinder connected between the swivel mounting and the frame.

Preferably the link between the swivel mounting and the hitch arm comprises a cylinder operable to adjust the angular position of the hitch arm relative to the swivel mounting.

The arrangement described herein may provide one or more of the following advantages:

a) Lifting is done by separate transport wheels so that no modification of the field ground wheels is required.

b) Movement to the transport position can be effected while the tractor remains connected to the hitch and the operator remains in the cab.

c) the position of the transport wheels ensures that they cannot interfere with crop during field operation.

The apparatus described herein can also be used for other machines which do not use cutters such as a merger.

The apparatus can be used particularly on pull-type sickle bar mowers with reels as well. This is a substantial advantage using the rear mounted system where the header is raised sufficiently high to allow the wheel to pass underneath, since the other systems could not be used since the front wheel would have to pass through the reel.

It is desirable that all of the wheels that engage the ground when the machine is in transport are deployed from the rear crop discharge side of the machine when the machine is in field position.

As an alternative, the lift height to allow the transport wheel to pass under the header could be obtained by lifting the machine higher with the field wheels allowing the transport wheels to be deployed from the rear following which the field wheels are withdrawn. Sickle mowers tend to lift higher than the disk mower so this would be more possible there.

The frame preferably includes a rear beam as the main structural element but other constructions are possible where the frame has different components providing the required structural strength.

The arrangement herein provides a construction including a mower with a hitch arm, that is a tongue that connects to the tractor, a carrier frame that carries the cutting head, lift system, field wheels which is attached to the hitch by a vertical pivot.

On a conventional machine the simplest arrangement has this whole assembly is articulated by means of a swing cylinder directly attached between the hitch and frame.

One key point about the construction herein is that it also acts to connect the transport wheel frame to the joining link through a horizontal pivot. Also the wheel frame cylinder that deploys the wheel frame about this horizontal pivot is connected between the joining (transport) link and transport wheel frame.

The coupling between the transport ground wheels and the frame is carried out by pivotal movement about two axes at right angles to move the ground wheels to the required position at the ground, the required orientation and the required position relative to the Center of Gravity of the frame in the transport position. This can be achieved by a coupling which is basically mounted on the frame for pivotal movement about a vertical axis for movement in a horizontal plane as described hereinafter and connects to the wheel subassembly for rotation about a horizontal axis. This arrangement is preferred because it provides movement in a plane parallel to the hitch arm movement so that a simple mechanical link can connect them. However another arrangement can provide the coupling which is basically mounted on the frame for pivotal movement about a horizontal axis for movement in a vertical plane and connects to the wheel subassembly for rotation about a vertical axis. Other mounting arrangements can also be provided to obtain the functions as defined herein.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
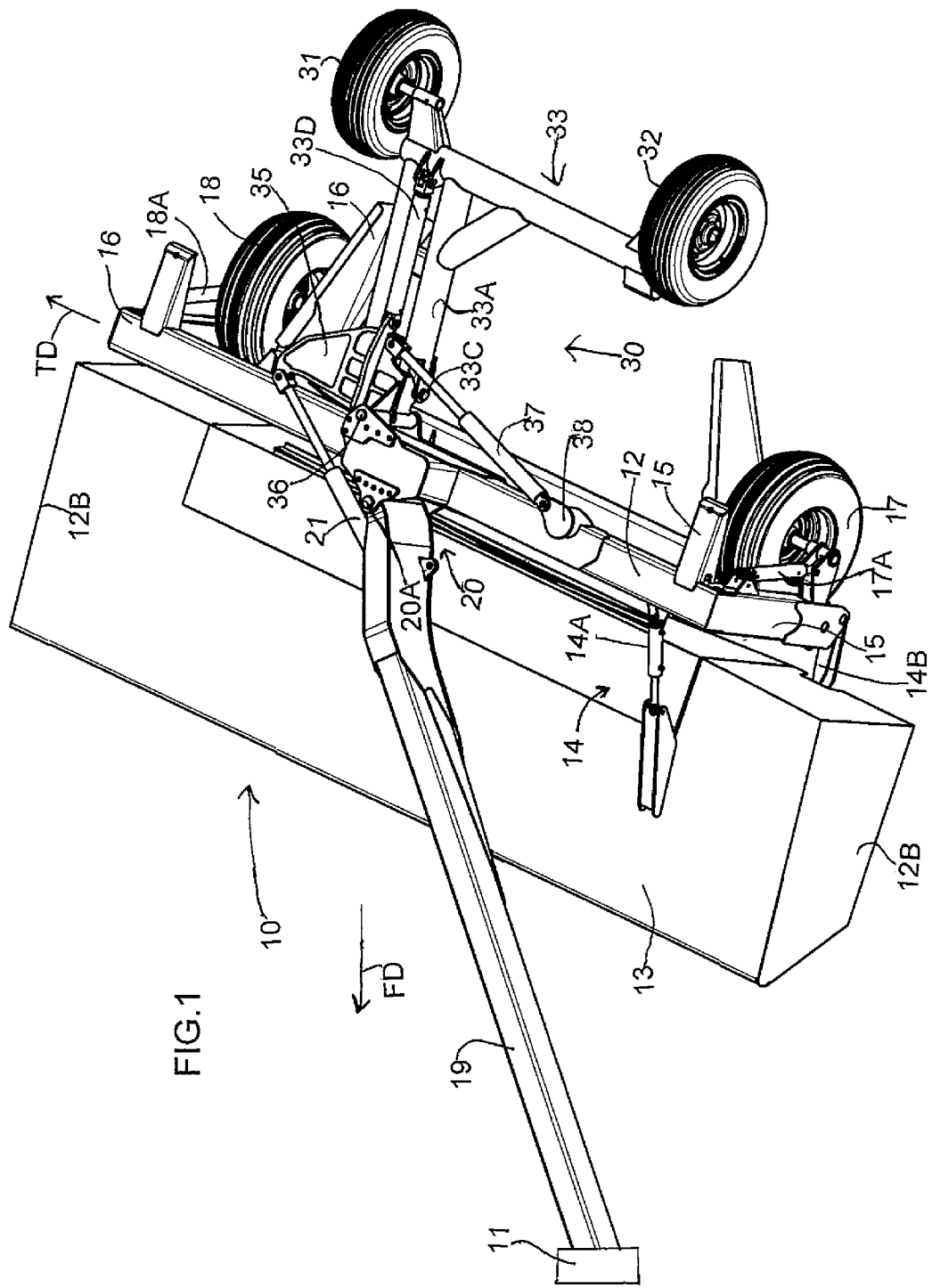
FIG. 1 is an isometric view from the rear and one side of a pull-type crop machine according to the present invention for attachment to a tractor, with the tractor omitted for convenience of illustration and showing the transport assembly in the field position.
Figure 5:
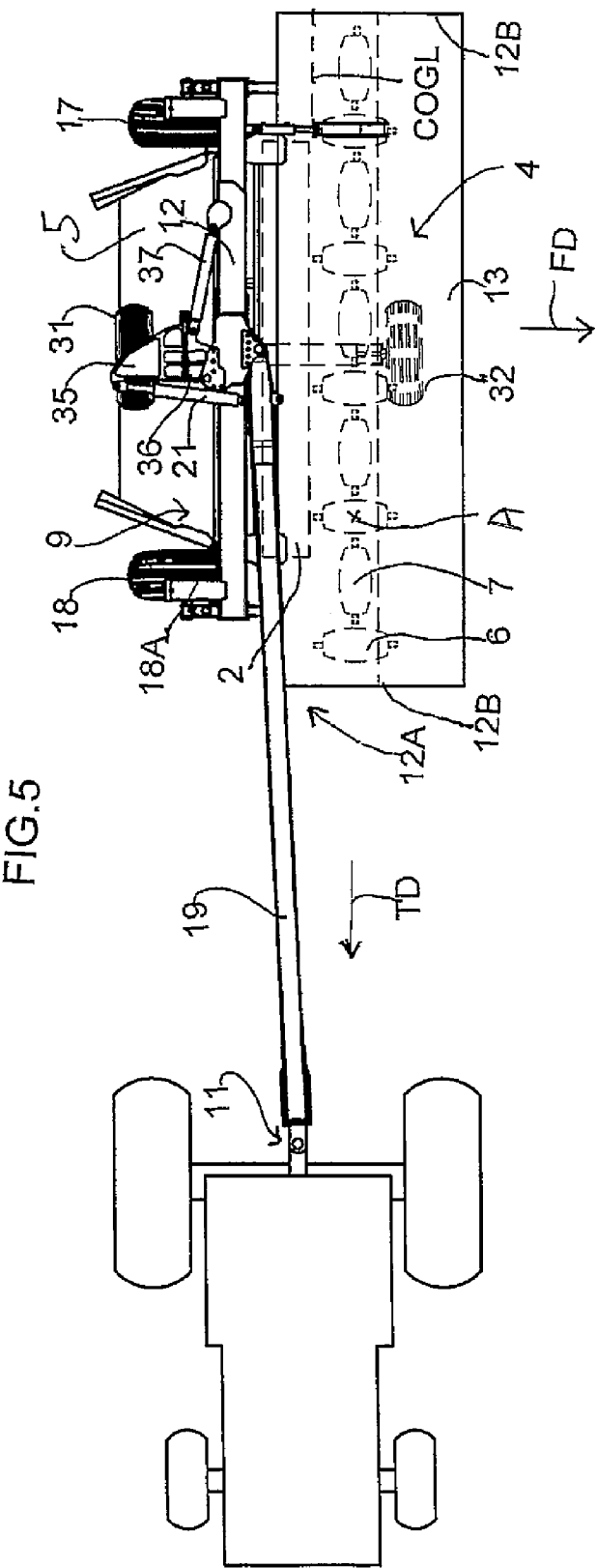
FIG. 5 is a top plan view of the cutter bar assembly of the crop header of FIG. 1 showing the transport assembly in the transport position.

In FIG. 1 is shown a pull type harvesting machine generally indicated at 10 for attachment to a hitch 9 of a tractor (not shown) by a hitch coupling shown schematically and generally indicated at 11. The crop harvesting machine shown is of the type which uses a cutting system 4 including a row of disks 7 mounted on a cutter bar 6 as shown in FIG. 5. Thus each disk 7 is mounted on the cutter bar 6 for rotation about its own upstanding axis A axis 5 with the axes spaced positions across the width of the cutter bar. Each disk carry blades at 180° spacing so that one disk rotate 90° out of phase with the next adjacent disk thus allowing the cutting action of the blades to overlap. Arrangements of this type are well known and many examples can be found in the prior art. The cutter bar of FIG. 5 is mounted on a frame generally indicated at 12A including forwardly extending side support members 12B. The disks are covered by a housing generally indicated at 13 so that the cutter system is enclosed for safety.

Behind the cutter bar 6 is provided a conditioner 2 which can be of a number of different types including a flail conditioner. At the rear behind the discharge opening 9 is provided a shield 5. This can act merely to assist in forming the swath or in respect of the flail conditioner may form a barrier to prevent high speed discharge of material which could impact surrounding persons or objects to cause damage.

The header frame 12A is mounted on a support frame including a main rear beam 12 across the rear of the header which extends in a transverse direction TD across the width of the harvesting device to a pair of legs 15 and 16 which depend downwardly from the transverse beam 12 to support a pair of wheels 17 and 18 which carry the frame in movement across the ground in the field or operating position. The wheels 17, 18 are fixed in forward direction along the forward field direction FD at right angles to the direction TD. The wheels can be adjusted in height by cylinders 17A, 18A in a limited adjustment movement only for adjusting the height of the frame from the ground for field operation and in a larger movement in one direction for raising the frame relative to the ground wheels to a height for deployment of the transport system described hereinafter and in the other direction for lowering the frame on to the transport system and for raising the ground wheels when transport system is in place.

The cutter bar 6 and associated components including the conventional conditioning system of the header frame 12A are carried on the main beam 12 by a suspension system generally indicated at 14 including bottom supports 14B which allows the cutter bar to float relative to the beam 12 for resting on the ground with the height of the beam 12 being adjustable to adjust the ground pressure from the cutter bar in well known manner. The angle of the header on the frame can be adjusted by optional cylinders 14A which cause the header to pivot about a horizontal axis. This adjustment can be omitted and replaced by a simple turnbuckle arrangement if the tractor does not carry enough hydraulic circuits to support this function.

A hitch arm 19 is attached to the transverse beam 12 by a mounting bracket 20 connected on top of the beam 12. In the embodiment shown the bracket 20 is located at the center of the beam 12 so that the hitch arm 19 can pivot about a vertical pivot pin 20A to one side (FIG. 1) or the other side (FIG. 2) under control of a cylinder 21. It will be appreciated that movement of the hitch arm 19 to one side acts to tow the harvesting machine in echelon to one side of the tractor and pivotal movement of the hitch arm 19 to the other side tows the harvesting machine in echelon to the opposite side. The hitch arm can also be located centrally in which case the harvesting machine is towed directly behind the tractor generally in a transport position. The cylinder 21 can also be used in some cases to steer fine movements of the header behind the tractor to locate the position of the header across the rear of the tractor and is used in the movement to transport as described hereinafter.

The above arrangement of pull type disk mower is well known and many examples can be found in the prior art including many patents by the present Applicants, to which reference may be made for further details not described herein.

In the present arrangement there is provided an additional transport device 30 attached to the beam 12 which in general allows the header to be lifted to raise the field ground wheels 17, 18 from the ground and to support the header on transport ground wheels 31 and 32 for transporting the frame 12A and the cutter system 4 carried thereon in the transverse direction TD towed by the tractor through the hitch arm 19.

As previously described, in the field position the hitch arm 19 extends from the frame generally forwardly for towing the machine in the forward direction FD. In the transport position the hitch arm is turned so that it extends from one end 12C of the frame generally in the transverse direction TD for towing the machine in the transverse direction.

The transport assembly 30 includes the two transport ground wheels 31 and 32 attached by a sub-frame 33 to the rear main beam 12 of the frame 12A for engaging the ground oriented in the transport direction and supporting the frame 12A and header during transport.

Figure 2:
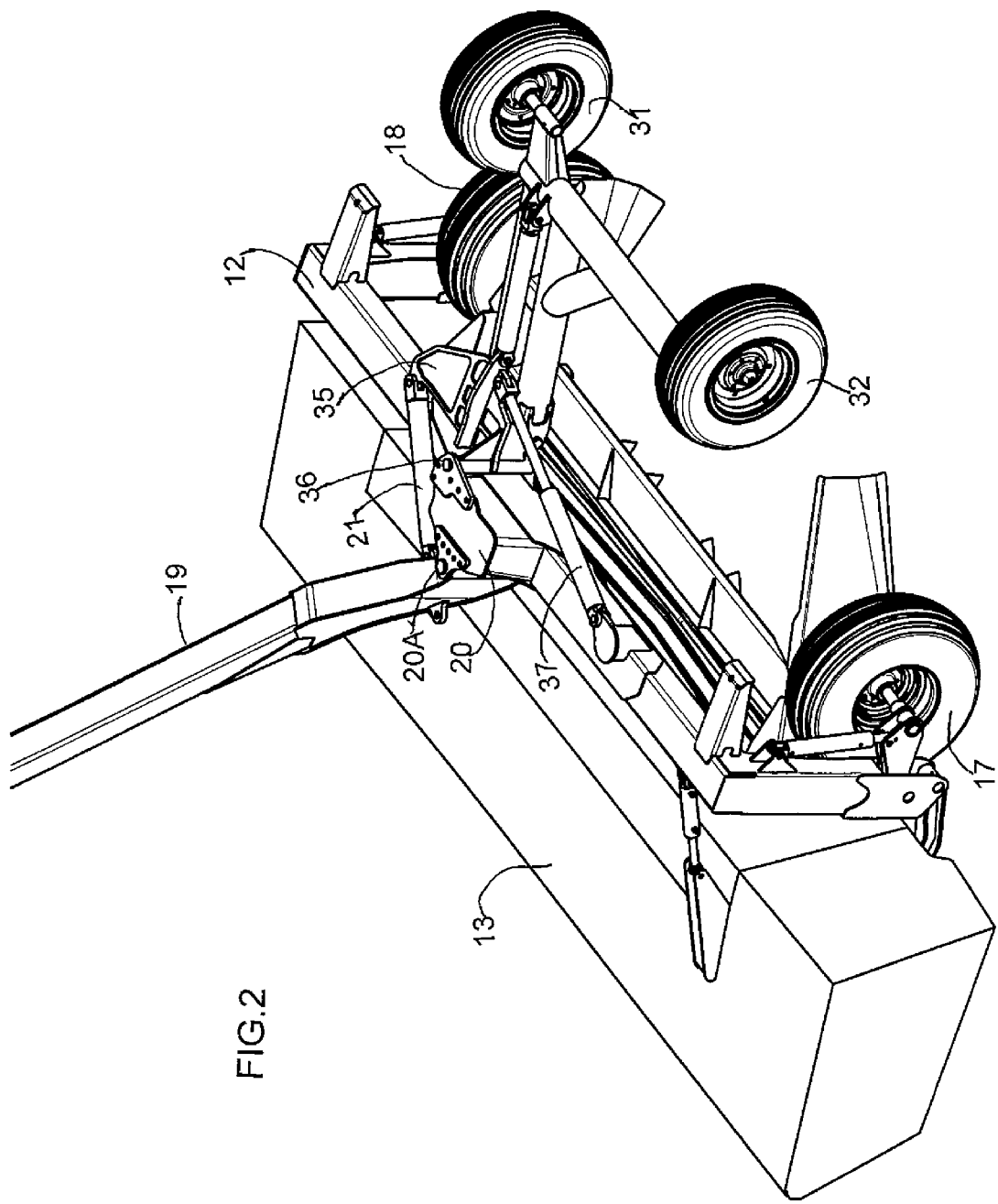
FIG. 2 is an isometric view from the rear and one side of the pull-type crop header of FIG. 1.
Figure 4:
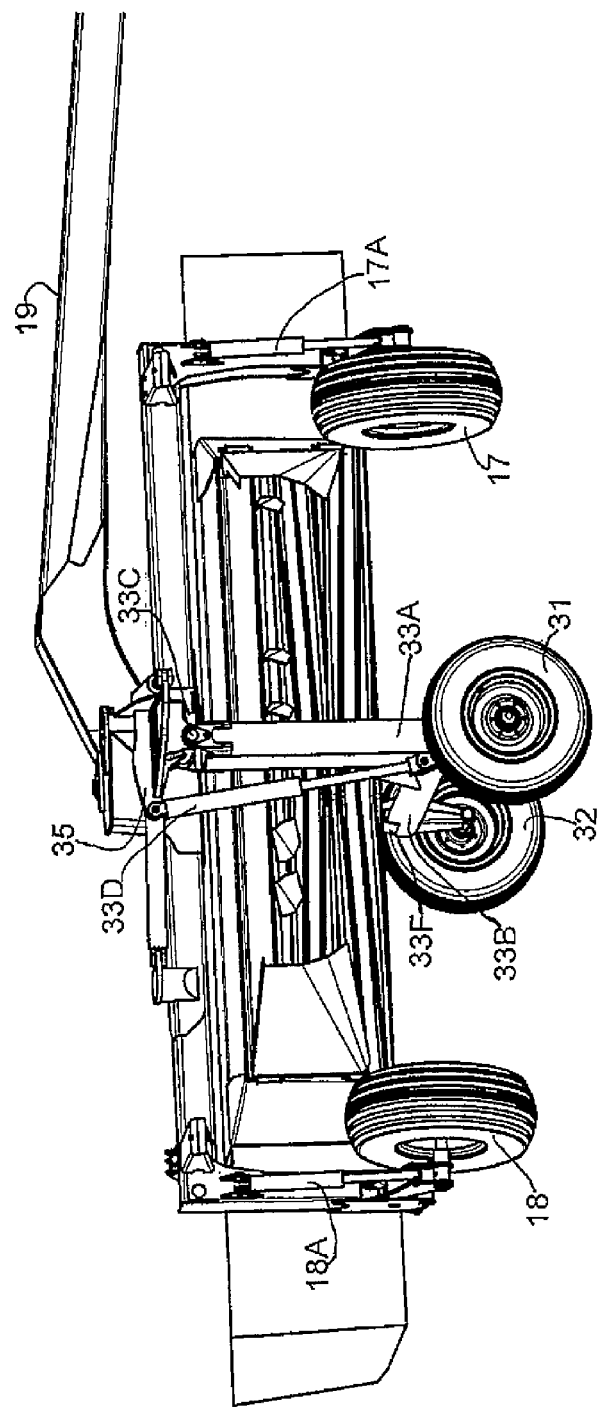
FIG. 4 is an isometric view from the rear and one side of the pull-type crop header of FIG. 1 showing the transport assembly in the transport position.

In general, the transport ground wheels 31, 32 are movable between a field position shown in FIGS. 1 and 2 and a transport position shown in FIGS. 4 and 5.

In the field position, the transport ground wheels are supported on the sub-frame 33 raised from the ground for field operation. The sub-frame and the wheels 31, 32 are carried from the main beam 12 so that the loads from the header are transferred through existing structure designed to carry the loads. The sub-frame and the wheels 31, 32 are carried from the main beam 12 so as to extend upwardly and rearwardly from the main beam. In this way the whole transport system is supported in the field position at a location where the transport system does not interfere with the crop either in front of the header during cutting, or during movement of the crop through the header after cutting or in the swath laid on the ground after processing.

In the transport position, the transport ground wheels 31, 32 are in contact with the ground with the field ground wheels 17, 18 lifted from the ground. In this way the field ground wheels are not used during transport and thus remain unchanged from their conventional operation and in the same orientation relative to the machine. There is no requirement to provide an increased height adjustment nor to provide a swivel mounting which changes the orientation.

In general, the transport assembly 30 is arranged to raise the frame 12A and the cutter system 4 by lowering the ground wheels 31, 32 to the ground and thus raising the frame and cutter bar to a height in which one of the transport ground wheels 32 can pass underneath the cutter system to a position in front of the cutter bar 6 and underneath the covers 13. That is the frame and the cutter system are raised by downward movement of the transport ground wheels 31, 32 to the position shown in FIG. 3 where the wheels roll over the ground underneath the main beam 12 to raise the main beam to a point where the ground wheels 17, 18 are off the ground.

The transport ground wheels 31, 32 are carried on a common sub-frame assembly 33 attached to the beam 12 of the frame 12A so that both the transport ground wheels are mounted between the field ground wheels 17 and 18 generally centrally of the beam 12.

Figure 3:
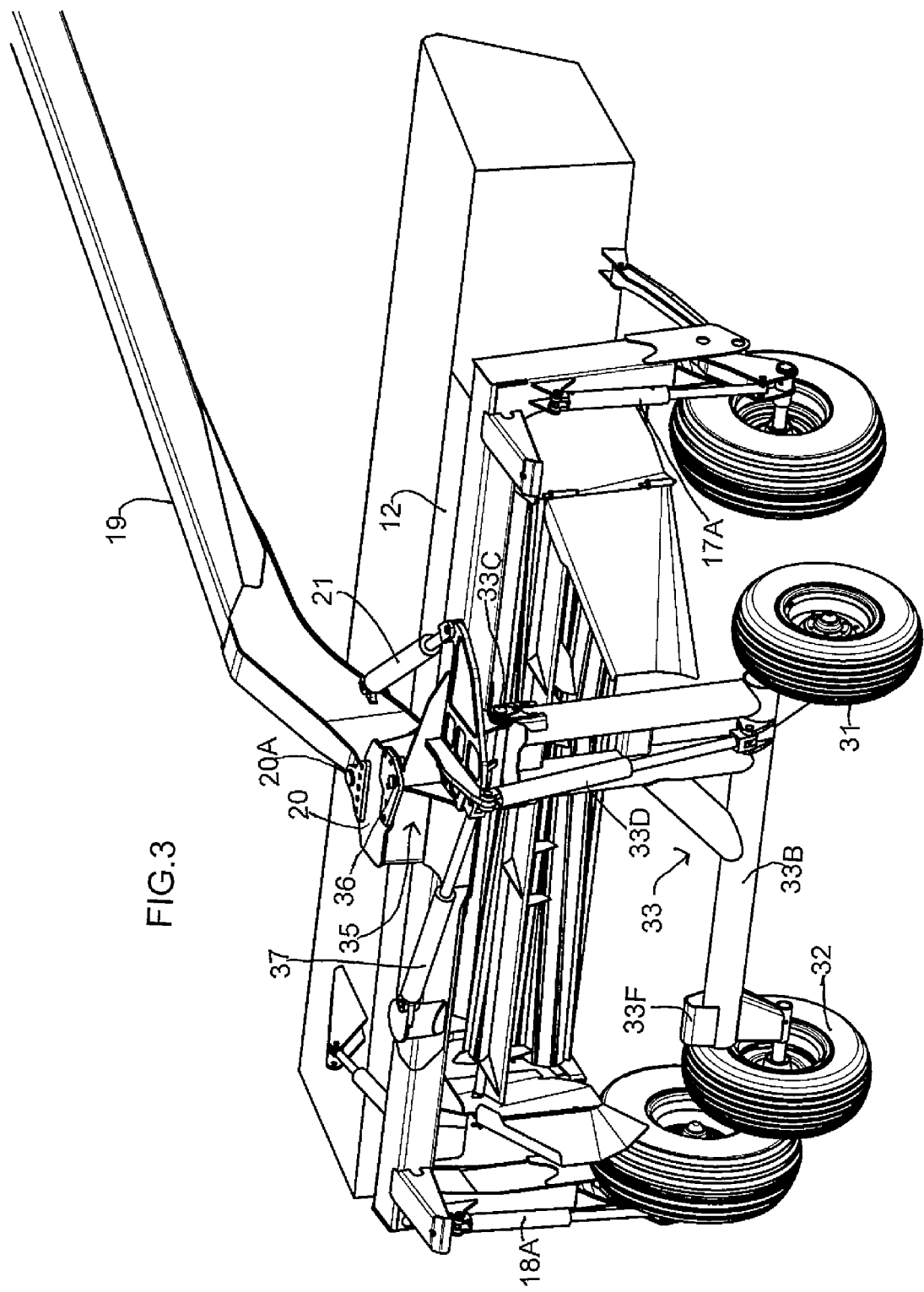
FIG. 3 is an isometric view from the rear and the other side of the pull-type crop header of FIG. 1 showing the transport assembly in a partially operated intermediate position.

The sub-frame 33 is generally L-shaped with a leg 33A which is upstanding in the position of FIG. 3 and a horizontal beam 33B. The wheel 31 is located close to the bottom of the leg 33A with the wheel 32 at the opposite end of the beam 33B. The leg 33A is formed of two parallel members for stability.

In the transport position the transport ground wheel 32 is at a position on a forward side of a line COOL (FIG. 5) parallel to the transverse direction TD containing the center of gravity of the machine and the transport ground wheel 31 is at a position on a rearward side of the line COGL. The transport ground wheel 32 is moved to its position on the forward side of the line COGL by passing underneath the cutter system 4.

The transport ground wheels 31, 32 are carried on the common sub-frame assembly 33 attached to the beam 12 where the top end of the leg 33A of the sub-frame assembly 33 is mounted for pivotal movement about a horizontal pivot pin 33C defining an axis of rotation parallel to the beam 12 to lower the transport ground wheels to the ground and lift the field ground wheels. Movement of the sub-frame 33 about the axis of the pin 33C is effected by a cylinder 33D. The pivot pin 33C is carried on a swivel mounting 35 which is connected to the frame for pivotal movement about an upstanding pin 36 defining a vertical pivot axis where the pin 36 is carried on the beam 12 and the bracket 20 attached thereto. Thus the pivot pin 33C rotates through approximately 90 degrees from the first position parallel to the beam 12 shown in FIG. 1 to the position shown in FIG. 4 where the pin 33C is at right angles to the beam 12.

Thus the swivel coupling and the sub-frame 33 define a vertical axis of rotation defined by the pin 36 for rotation of the wheel 31 to the transport direction and for movement of the wheel 32 to the forward position. Also the swivel coupling defines a horizontal axis of rotation defined by the pin 33C for the sub-frame to move downward to lower the wheels 31, 32 to the ground.

In operation therefore the coupling of the ground wheels 31 and 32 carries the wheels from the main beam 12 and provides movement relative to the beam to move the wheels downwardly while remaining parallel to the forward direction. The beam 33B then rotates relative to the beam 12 and thus turns both wheels 31 and 32 to the transport direction while carrying the wheel 32 underneath the header including the cutter system to the transport position as described above.

While the description herein is presented in respect of the beam 12 of the header, typically during rotation the transport wheels stay relatively stationary on the ground and the front of the hitch stays stationary relative to the tractor while the beam 12 and header frame 12A carried by the beam rotate into place above the transport wheels. This is desirable since the header does not move much relative to the tractor so that transport can be engaged in minimal space. It also makes for smooth operation with minimal tire scrubbing.

A channel 33F welded onto the top of the beam 33B at the end adjacent the wheel 32 provides an engagement member for butting against the cutter bar 6 which is located underneath the cutter bar 6 and provides a rest point for the header to take some load, in both the vertical and transport directions. This can be merely a resting point or made more elaborate in such as by latching arrangements to provide coupling with the cutter bar.

As shown in FIG. 5, the beam 33B is only of a length to locate the wheel 32 just in front of the cutter bar 6 and underneath the cover 13. The height of the cutter bar ensures that the wheel does not interfere with any component as it rotates and carries the header. The beam is of a length which does not present the wheel 32 in front of the header. This is due to practical limitations of its length which would otherwise cause interference with the field wheel 17. Also it is desirable to locate the transport beam 33B at a position in transport which is behind the center of gravity of the implement so that there is some weight on the tractor drawbar.

The movement of the sub-frame 33 about the vertical pin 36 is actuated by a cylinder 37 connected between the swivel mounting 35 and the beam 12 at a coupling 38. The movement of the swivel mounting 35 is communicated to the hitch arm 19 by the cylinder 21 which extends between the hitch arm 19 and the swivel mounting 35. This acts to connect the hitch arm and the ground wheel 32 while the header and beam 12 move relative to these elements.

Thus in the transport position, the transport ground wheel 32 is at a position on a forward side of a line in the transverse direction containing the center of gravity of the machine and the other of the transport ground wheels is at a position on a rearward side of the line in the transverse direction containing the center of gravity of the machine. The actuation arrangement provided by cylinder 37 and the cylinder link 21 acts to move the hitch arm and the transport ground wheels between the field position and the transport position in simultaneous operation such that the machine remains balanced on the transport ground wheels 31, 32 and on the hitch arm 19 while the hitch arm remains attached to the tractor during the movement to said transport position.

The swivel mounting 35 forms in effect a universal coupling and moves itself in a horizontal plane about the vertical pivot pin 36 which maintains the cylinders 37 and 21 in the same plane common plane with the hitch arm 19 while the transport ground wheels are mounted on the swivel mounting 35 for the downward deployment movement actuated by the cylinder 33D. For convenience of explanation, the wheel 32 is sometimes herein referred to as the front transport ground wheel as it is in front of the cutter bar when in ground position and the wheel 31 is referred to as the rear transport ground wheel, even though these wheels are on either side of the cutter bar when in transport.

Figure 6:
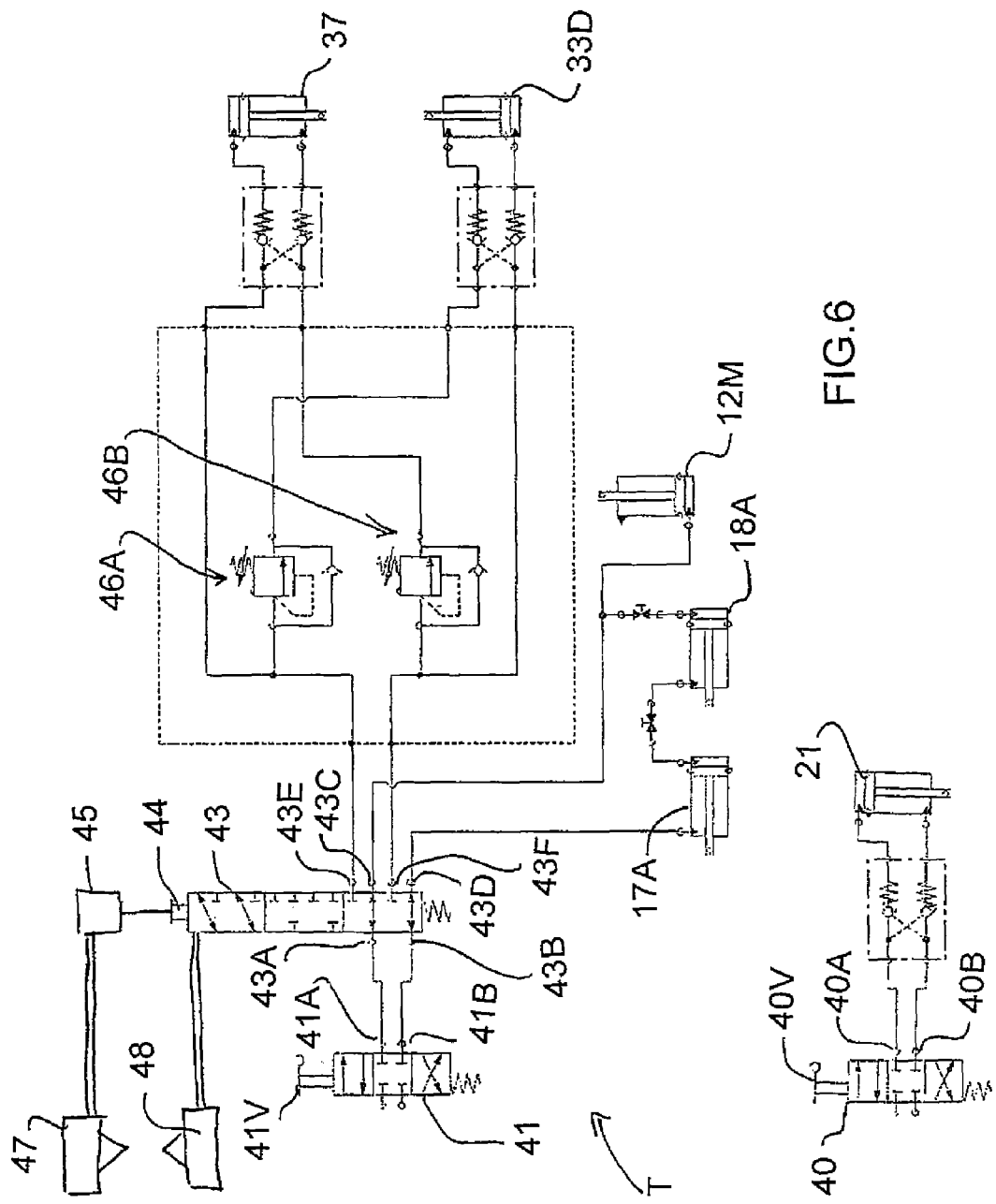
FIG. 6 is a schematic diagram showing a first embodiment of the hydraulic circuit for operating the transport system of FIGS. 1 to 5.

Turning now to FIG. 6, there is shown a schematic of an embodiment of the circuit for controlling the operation of the hydraulics of the header from the tractor T. The tractor includes a first and a second hydraulic fluid supply circuit 40, 41 each having a control valve 40V, 41V operable to supply fluid pressure at either one of a pair of ports 40A, 40B of the supply 40 and 41A, 41B of the supply 41 with the fluid returning to the other of the ports as controlled by the valve.

In this embodiment, the steering cylinder 21 which is a double acting cylinder is controlled in steering action by the supply 40.

In this embodiment the lift cylinders 17A, 18A are on the same circuit from the supply 41 as the transport actuation cylinders 37 and 33D. A switching valve 43 is provided which includes a plunger 44 operated by a mechanical linkage 45 described hereinafter and shown in FIGS. 7 to 10. The valve 43 has inlet ports 43A and 43B and operates to select output port 43C and 43D or ports 43E and 43F depending on the position of the plunger 44.

In a depressed position of the plunger, the valve switches the flow to ports 43E, 43F to operate the transport deployment cylinders 37 and 33D.

In the released position of the plunger, the valve switches the flow to ports 43C, 43D to operate the lift cylinders 17A, 18A which are connected in series in a master/slave configuration.

The deployment cylinders 33D and 37 are operated sequentially by two separate sequence valves 46A, 46B. One sequence valve ensures that cylinder 33D fully extends before allowing cylinder 37 to retract, for placing the header in transport configuration. The other sequence valve ensures that cylinder 37 fully extends before allowing cylinder 33D to extend, for placing the header in field configuration.

Thus in this arrangement, the lift cylinders 17A, 18A and transport hydraulics 37, 33D are on the same circuit and the steering cylinder 21 is on a separate circuit. This arrangement is effective in an arrangement where the tractor has only two supply circuits 40 and 41. In a situation where a third circuit (not shown) is available, this can be used for the cylinder 14A to tilt the header.

The mechanical linkage 45 includes a pair of guide arrows 47, 48 which provide a visual indication to the driver when the linkage is in the required location to cause the depression of the plunger 44. One of the arrows 48 is connected to the member carrying the switch 43 and the other 47 is connected to the mechanical linkage 45 so that the arrows become aligned only in a predetermined angular position of the hitch arm 19 relative to the beam 12 and are maintained aligned during movement of the components as described hereinafter.

As shown in FIGS. 7 to 10, the valve 43 is carried on a horizontal arm 49 pivotal around the axis of the pin 20A of the hitch arm 19. The arm 49 also carries the lower arrow 48. The angular position of the arm 49 around the axis of the pin 20A is controlled by a link 52 attached to an arm 53 carried on the swivel coupling 35.

A slotted link 42 with a slot 42A is connected to the actuator 44 of the valve 43 with a bolt 44A that can pivot. The slotted link 42 is also connected to a finger 51 that has a pivot bolt 51A that connects to the slot of the slotted link 42 with freedom to slide and turn within the slot. When the pivot bolt 51A of finger 51 hits the end of the slot 42A in the slotted link 42 any further travel will cause the mechanism to depress the valve actuator 44 to depress the spring return plunger that is part of the valve 43 and switch the valve 43 from lift function to transport function. At all other location in the slot the valve actuator the valve remains in lift mode. The device uses two overlying slotted links to prevent binding of the sliding and pivot connections of the pin 51A. The link 42 has an additional flange 42F to mount the indicator arrow 47. The arrow 48 is carried on the arm 49 so as to move with the switch 43.

The mechanical linkage 45 thus comprises the arm 49 that carries the switch 43 and is caused to rotate with the swivel mounting 35 around the pin 20A; the finger 51 which carries the pin 51A and is mounted on the end of the hitch 19 to move with the hitch and the link 42 carried on the pin 44A which carries the slot 42A and acts to depress the plunger through the pin 44A when the pin 51A reaches the bottom of the slot. In this way, these components act to allow operation of the transport system by operating the switch 43 only when the switch is at the required angle to the beam 12 and acts to maintain the switch operated while the hitch and transport system move relative to the beam 12 to the intermediate position before the transport position.

The plunger 44 is operable by the pin 44A which is pushed forwardly to depress the plunger when the pin 44A reaches the end of the slot 42A. The location of the switch 43 on the arm 49 as controlled by the link 52 is arranged relative to the push rod link 42 so that the plunger is depressed only when the hitch arm is at or closely adjacent a predetermined angle relative to the beam 12.

The geometry of the link 52 relative to the arm 49 is arranged to move the switch 43 so that its plunger remains depressed as the swivel coupling 35 and the hitch arm 19 are simultaneously moved by operation of the cylinder 37 during the movement to the transport position.

The position of actuation is chosen so machine remains stable during transport deploy. The position of actuation is an intermediate position of movement of the hitch and not at one end limit. That is the system does not operate as a sequencing system where the position is at one end of a movement of a first component of the machine so that the next action can only take place after the first component has completed its movement. The linkage operating the switch 43 is directly actuated by the hitch of the machine as opposed to other components such as the lifting of the ground wheels or as part of the transport actuation. That is the position of the hitch which actuates the switch 43 enables the movement to transport to be initiated and is itself not a part of the transport actuation.

The criteria for choosing the range of angles in which transport is active include:

To avoid the extreme range to one side of the machine that would cause instability.

To keep the lift active at the two extremes of movement of the front swing cylinder since these are the normal field operating positions for the hitch.

To keep lift active in straight ahead position in case somebody wants to cutting here for recutting, opening field etc.

To be small so that lift is available to the operator in the majority of hitch positions for ease of field operation.

So that in the preferred embodiment the rear transport cylinder can complete its movement and move the transport wheels to be in proper position under the machine before or when the hitch reaches the transport position, that is it hits a stop).

So that in the preferred embodiment the operator can finish moving the hitch from the intermediate position to the latch position with the front cylinder so that the valve can switch from transport to lift function and allow the system to retract the wheels, lower the header onto the stop, close the latch and then reverse these steps for disengaging transport.

The following steps are undertaken to place the header in transport mode:

1. Preferably move the tractor to a position to line up the hitch parallel with tractor.

2. Operate steering cylinder 21 using the valve controlled supply 40 to rotate header so that the top arrow 47 is not pointing at the bottom arrow bracket 48. In this position, the plunger 44 of the valve 43 is spring returned and not depressed, allowing the lift cylinders 17A, 18A to be operational.

3. Fully extend the lift cylinders using the supply 41 from the tractor so that the header is lifted off the ground by lowering the wheels 17, 18 to the bottom position.

4. Operate the steering cylinder 21 using the supply 40 to rotate the header until arrows 47, 48 are lined up at the required predetermined angle of the hitch arm relative to the beam 12. In this position the plunger 44 is fully or partly depressed allowing the transport circuit including the cylinders 37 and 33D to be operational and to disconnect the lift cylinders. At the predetermined position, the header beam 12 is roughly 16 degrees past being perpendicular with the hitch arm 19. This can be adjusted. The switching between functions typically occurs when the plunger is partially depressed thus defining a range of angles rather than one specific angle where the transport is active.

5. Operate the supply 41 to fully extend the transport deploy cylinder 33D and fully retract transport swing cylinder 37. As stated previously the transport deploy and swing cylinders are plumbed in parallel with the sequence valve 46 set to, for example, 2000 psi on the line to the swing cylinder 37. The transport deploy cylinder 33D thus fully extends and reaches the 2000 psi pressure opening up the sequence valve, allowing oil to go to swing cylinder 37 and fully retract it causing the simultaneous movement of the transport subframe 33 and the hitch arm 19. The above mechanical linkage defined by the arm 49 carrying the switch 43, the link 52 and the finger 51 carrying the link 42 ensures that the plunger 44 remains depressed during this movement. We have a pressure setting that when exceeded switches the function. It needs to be high enough to fully lift the machine consistently and but below the tractor operating pressure so that the swing cylinder can be operated. The machine could however be made to operate at lower setting by increasing cylinder bore or changing geometry.

6. The movement caused by the cylinder 37 is arranged so that the hitch remains short of its position shown in FIG. 8 at the end of the frame where a latch element 19L on the hitch arm 19 is arranged to engage a latch element 12L on the beam 12. This halting of the hitch at the short position allows the lift cylinders to be reengaged by moving the hitch with the steering cylinder 21 and also avoids the necessity for ensuring that the hitch and transport wheels reach their target positions exactly at the same time. Then front steering cylinder 21 is used to complete the movement to the transport position. During this movement the linkage switches the hydraulic valve so that the lift cylinders are activated. The operator then uses the lift cylinders to lower the header onto support 33F which at the same time raises the field wheels for maximum ground clearance and at the same time closes the hydraulic latch.

Thus for transport, if the hitch arm is not in the correct position for transport when it has been moved by movement of the swivel coupling 35 caused by the cylinder 37, the cylinder 21 is operated to move the hitch arm to the required position.

With the wheels in the transport position, the header can be lowered relative to the beam 12 by operation of the cylinders 17A, 18A so as to drop the cutter bar onto the beam 33B extending across underneath the cutter bar to provide stability and to reduce the cantilever loads. The connecting bracket 33F can be provided to improve connection between these elements.

Figure 14:
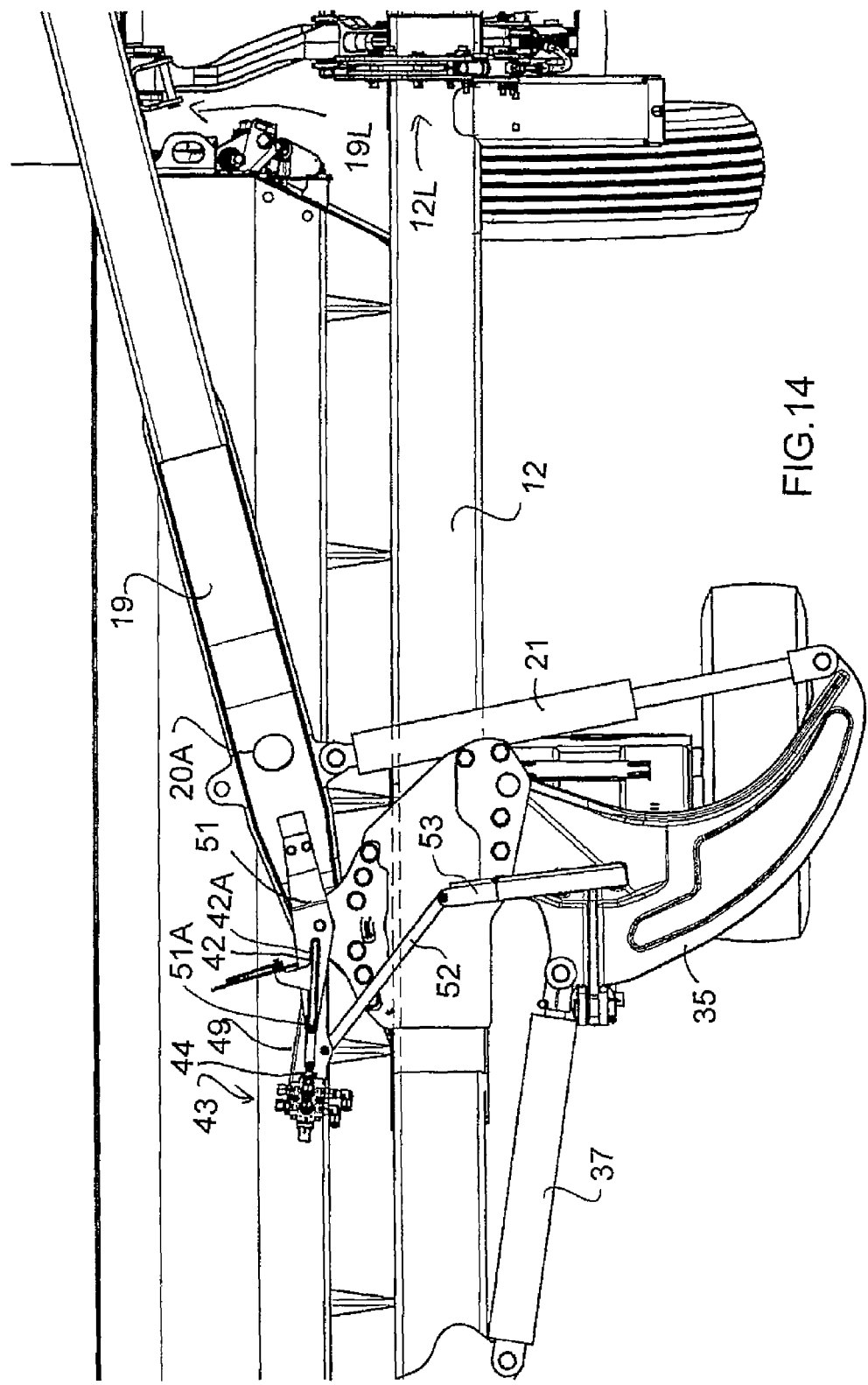
FIG. 14 is a top plan view of the hitch connected at the beam of the frame with the hitch moved to the intermediate position prior to latching and showing the switch valve and mechanical linkage in position to continue to allow operation of the transport system.

7. At this position (FIG. 14), the supply 40 is activated to retract the steering cylinder 21 until the header engages the latch 12L on beam 12. In this position the predetermined cooperating angle between the switch 43 and the mechanical linkage is changed to release the plunger 44 so that the lift cylinders 17A, 18A are again activated and are operational.

8. The lift cylinders are retracted to sit the header cutterbar on transport leg bracket 33F and to raise the wheels 17, 18 to their highest position to clear obstacles.

Figure 15:
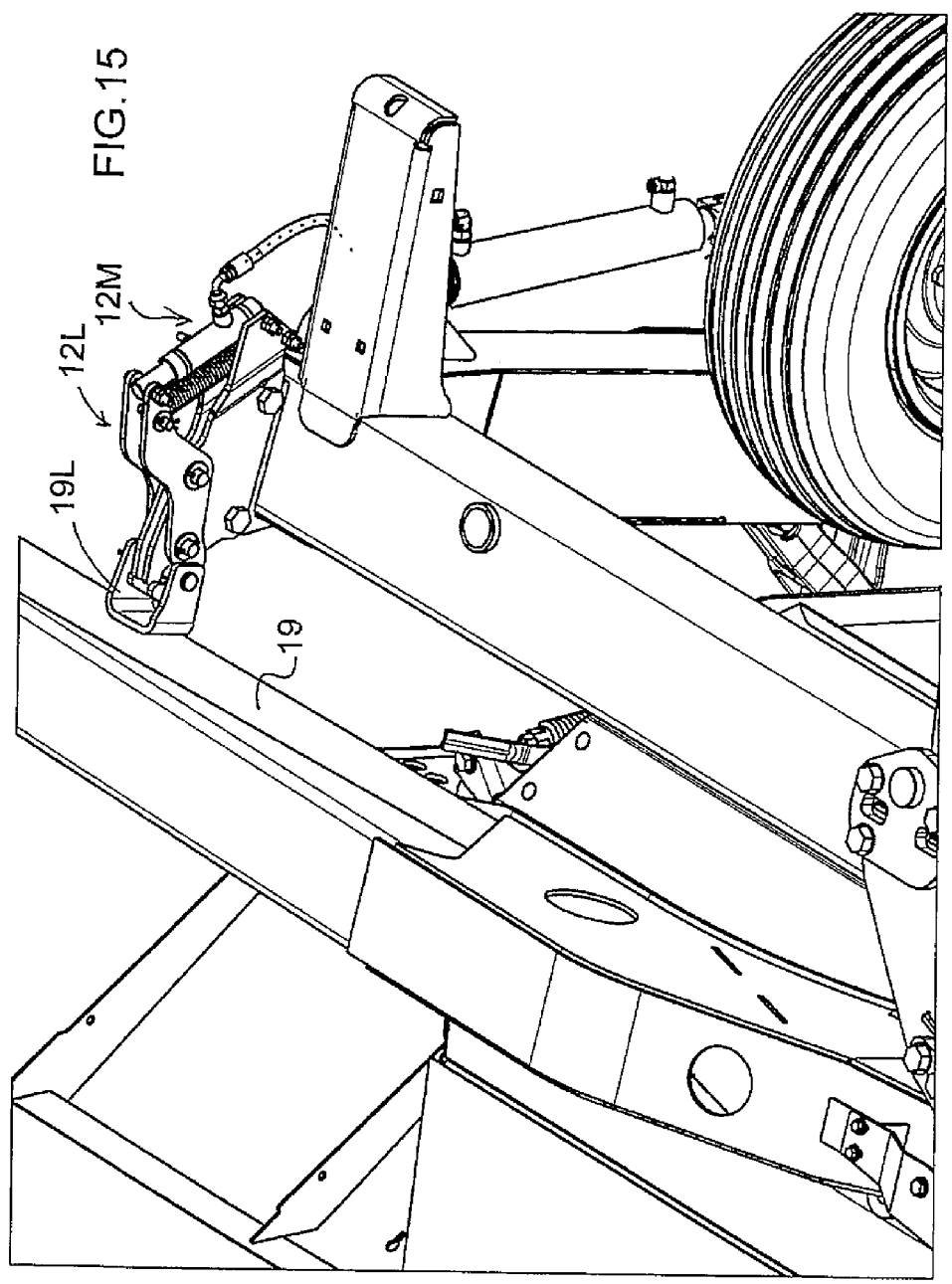
FIG. 15 is an isometric view of the hitch in the latched position.

The reverse operation from transport to field mode is carried out as follows:

1. Preferably line up the hitch arm parallel with the tractor.
2. Disengage the frame latch 19L, 12L. This can be done at the latch manually or there may be provided an electrically operated release in the cab. However more preferably this is carried out using the latch cylinder 12 M shown in FIG. 15 and shown in FIG. 6 in the same circuit as the lift cylinders 17A, 18A.
3. Fully extend the lift cylinders 17A, 18A.
4. Operate the steering cylinder 21 until the arrows 47, 48 are lined up indicating that the mechanical linkage has depressed the plunger to operate the switch 43.
5. Fully extend the transport swing cylinder 37 and fully retract the transport deploy cylinder 33D in sequence as explained above.

For a center pivot machine angle the hitch must move relative to machine centerline to reach transport position is in the order of 90 degrees while the normal working range of the front swing cylinder is in the order of 45 degrees from centerline.

In an alternative arrangement, movement of the hitch to rear frame could be accomplished by extending the range of the front cylinder and having it connected to the rear frame like a conventional machine rather than through the swivel coupling. A problem is the cylinder cannot be allowed to fully extend in field mode with field wheels carrying the machine or the machine will be unstable. In operation the operator would have to deploy the transport wheels into transport position or a stable intermediate position before fully extending the cylinder so that the machine remains stable. A control linkage or proximity sensor control as previously described could be used to prevent the swing cylinder from operating at unstable hitch to machine positions in field mode and/or switch hydraulic function between steering and transport operation. A removable stroke limiting stop such as a rod sleeve or stop between hitch and frame could be provided for the operator to reduce steering cylinder so the stroke is reduced to the order of 45 degrees for convenience of operation during field mode."

With the link system provided by the cylinder 37 and swivel mounting 35 connected to both the hitch 19 and beam 12 it can be arranged so that some or all of the movement between hitch 19 and beam 12 is provided by actuating the rear cylinder 37 since both the hitch and transport swing relative to the beam 12 and header frame 12A. This way no additional range to the front cylinder 21 is required. When the transport rear cylinder 37 swings into field mode, the front cylinder 21 functions as normal on a center pivot machine which has no transport system.

It should be noted that a mechanical stop between the hitch 19 and beam is also an important part of the position control using the preferred embodiment. This allows the operator to fully actuate the rear cylinder 37 and then finish using front cylinder 21 until hitting the stop.

An alternative to the mechanical stop would be to provide an indicator or control so the operator starts with the front swing cylinder 21 in the correct position before engaging the transport.

In the preferred embodiment the hitch actually latches to the rear frame at the stop. This not only does not allow the operator to inadvertently operate the swing cylinder 21 and 37 during travel in transport position but also provides a redundant connection so that if either of the cylinders 21 and 37 failed mechanically the latch would still hold.

In the preferred embodiment described above, the system activates the latch cylinder 12M with the lift so that when the operator drops the header onto the transport frame and at the same time lifts the field wheels the latch 12L is activated. This has the benefit of forcing the operator to lift the header from the support before swinging out of transport.

In an alternative arrangement, since the two fairly sophisticated control mechanisms described above are not strictly necessary for the arrangement to operate, there can be provided a simplified set of steps. Simply the system needs to 1) deploy the transport wheels under the frame using the cylinder 33D and 2) Swing the machine into transport position using the rear cylinder 37.

For a center pivot machine, it is preferable that the rear cylinder completes its turn so that the third step of completing the motion with the front swing cylinder 21 has been added. This requires the operator to start in a range that allows the rear cylinder to complete its actuation. This is made much easier by adding a visible mechanical stop latch 12L at the transport position.

An alternative would be to provide an indicator so the operator could first position the hitch 19 in the correct position. Then the rear swing cylinder 37 can complete its actuation at the correct transport position.

Another reason for the sophisticated control is that with the hitch swung all the way to the same side that the transport wheel at the end of the "L" is on, when the transport wheels first lift the machine off the ground the machine becomes unstable. This is because the COG is ahead of the triangle defined by the wheels and hitch. Limiting the range of hitch angles that the transport is operable in prevents this. Another solution might be to add ballast to move the center of gravity rearward or on other types of machines this may not be a problem at all.

In the preferred embodiment the latch cylinder is plumbed in parallel to the lift cylinder so it automatically opens when you extend the lift cylinders to raise the header off of support 33F. This feature also prevents you from being able to turn the transport without lifting the header off the support which can cause issues since the support could get caught on the conditioner.

Figure 7:
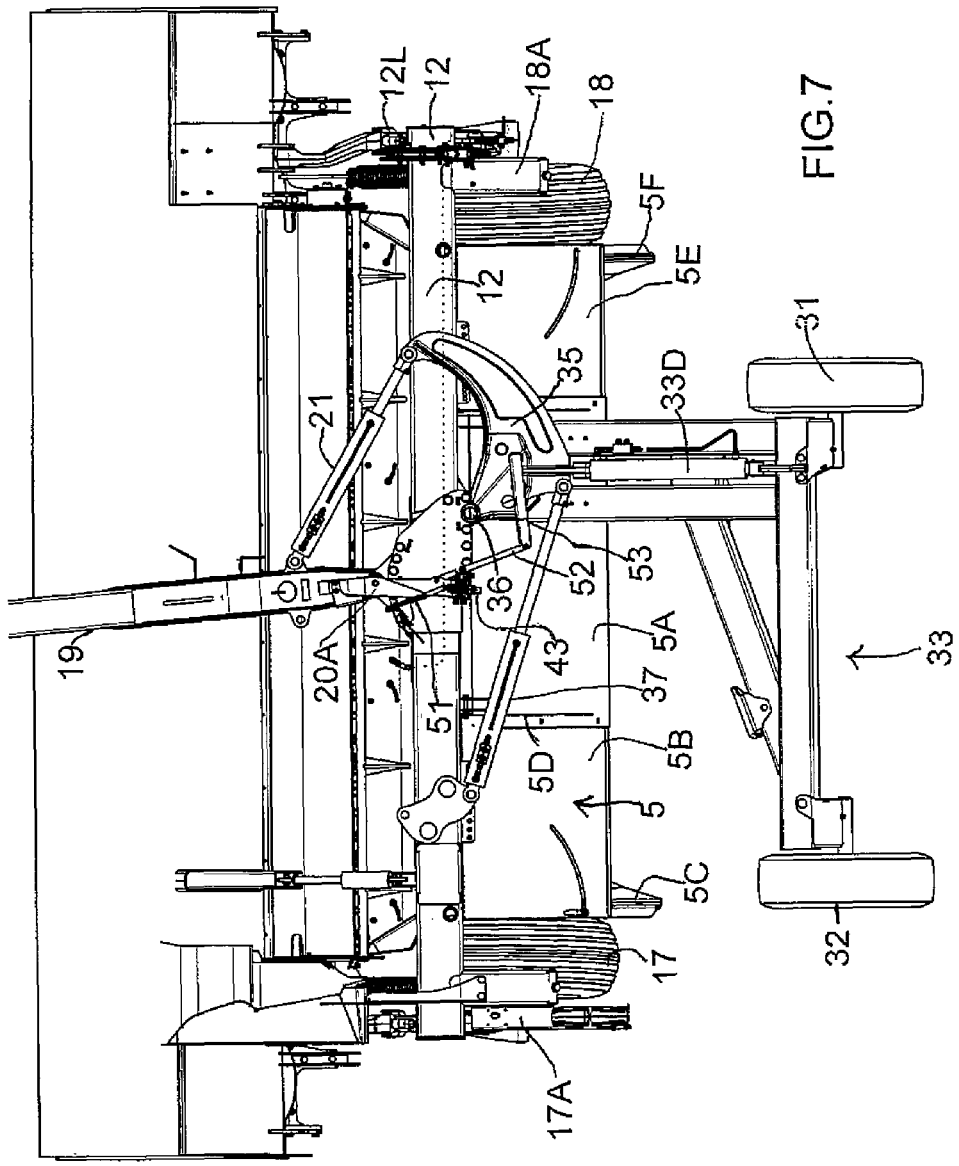
FIG. 7 is a top plan view of the cutter bar assembly of the crop header of FIG. 1 showing the transport assembly in the field position and showing the switching system for the circuit of FIG. 6 which is omitted from FIGS. 1 to 5.
Figure 8:
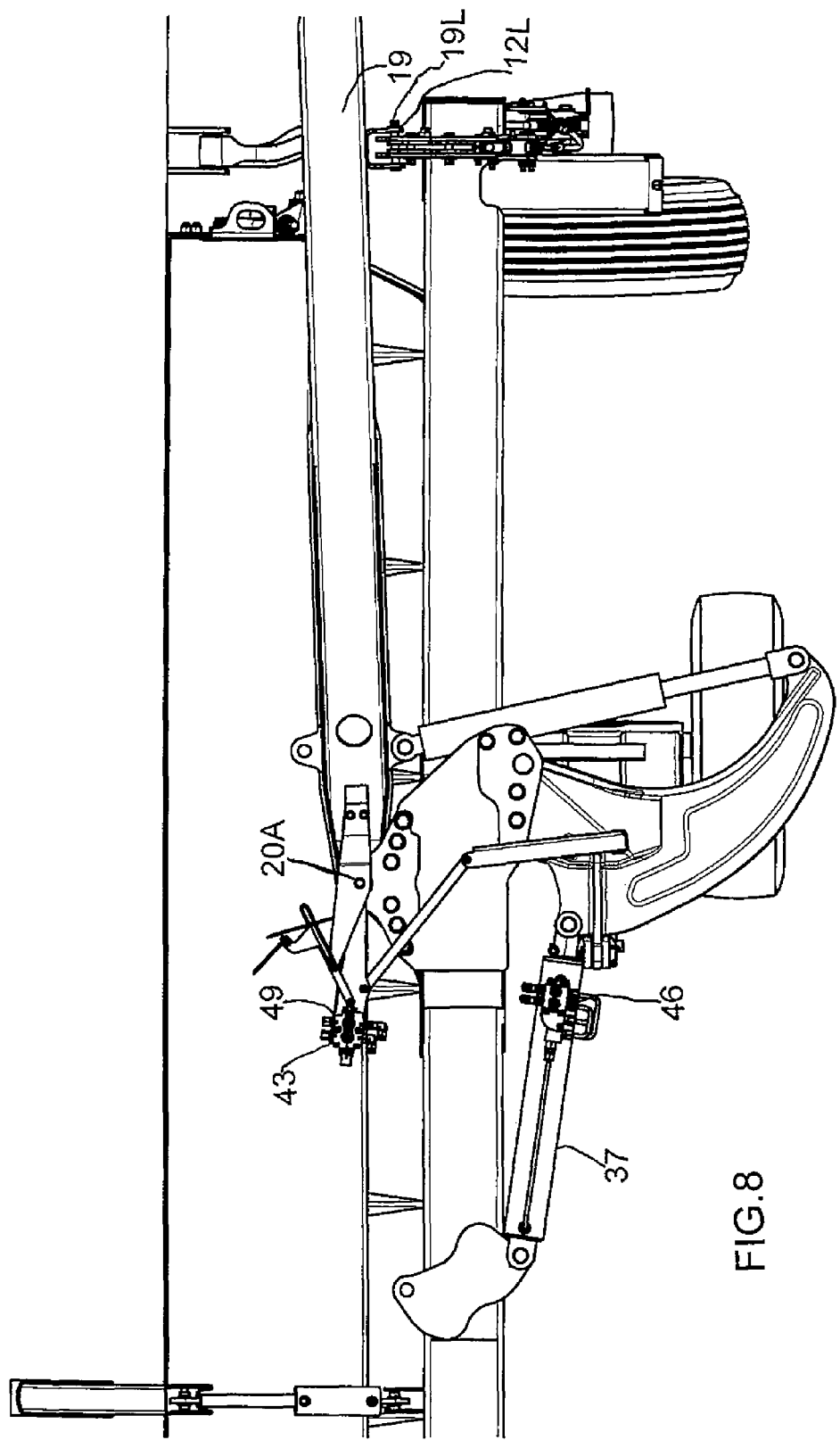
FIG. 8 is a top plan view of the cutter bar assembly of the crop header of FIG. 7 showing the transport assembly in the transport position.
Figure 9:
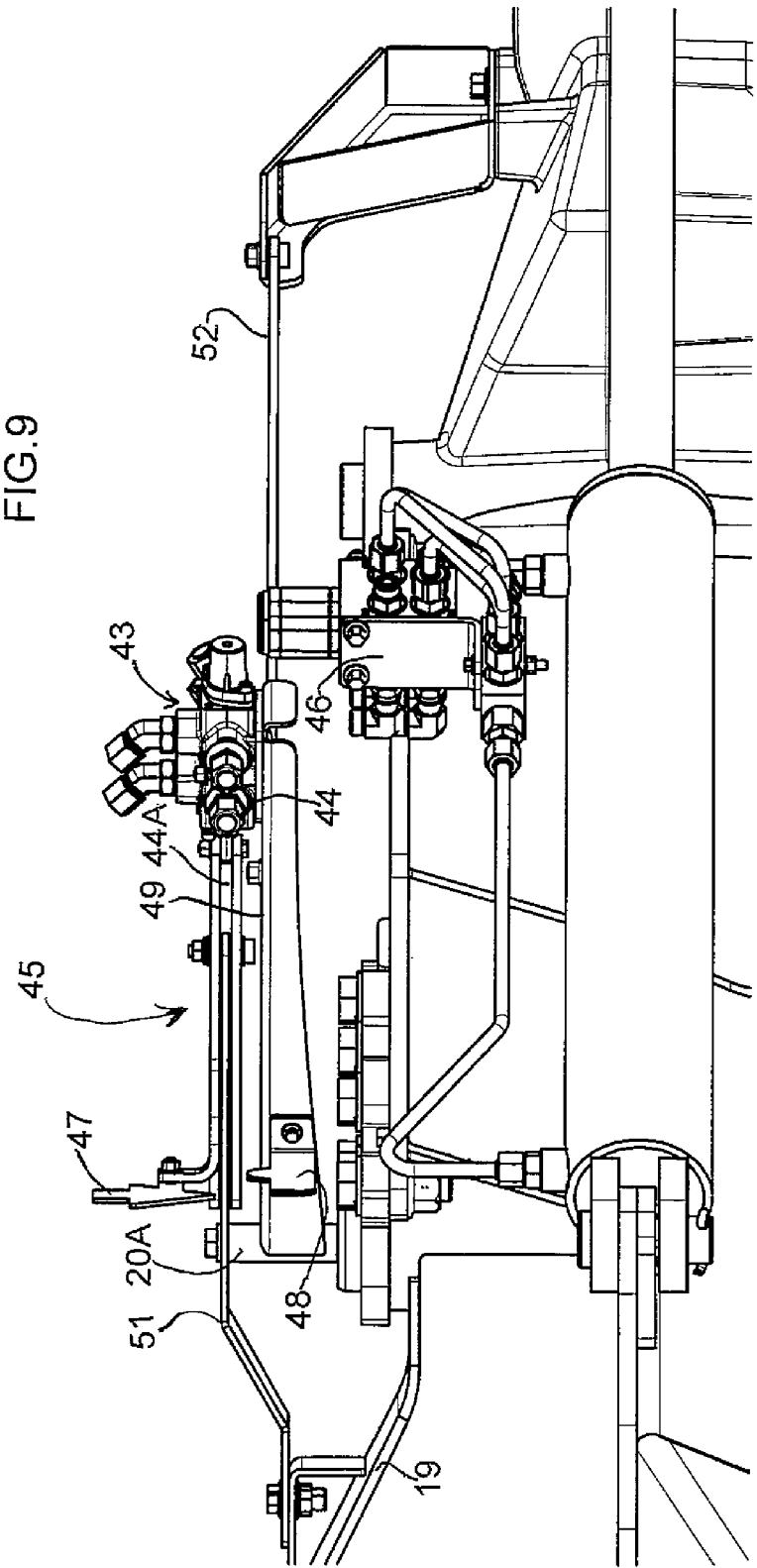
FIG. 9 is a first isometric view of the switching system of FIG. 7 for the circuit of FIG. 6.
Figure 10:
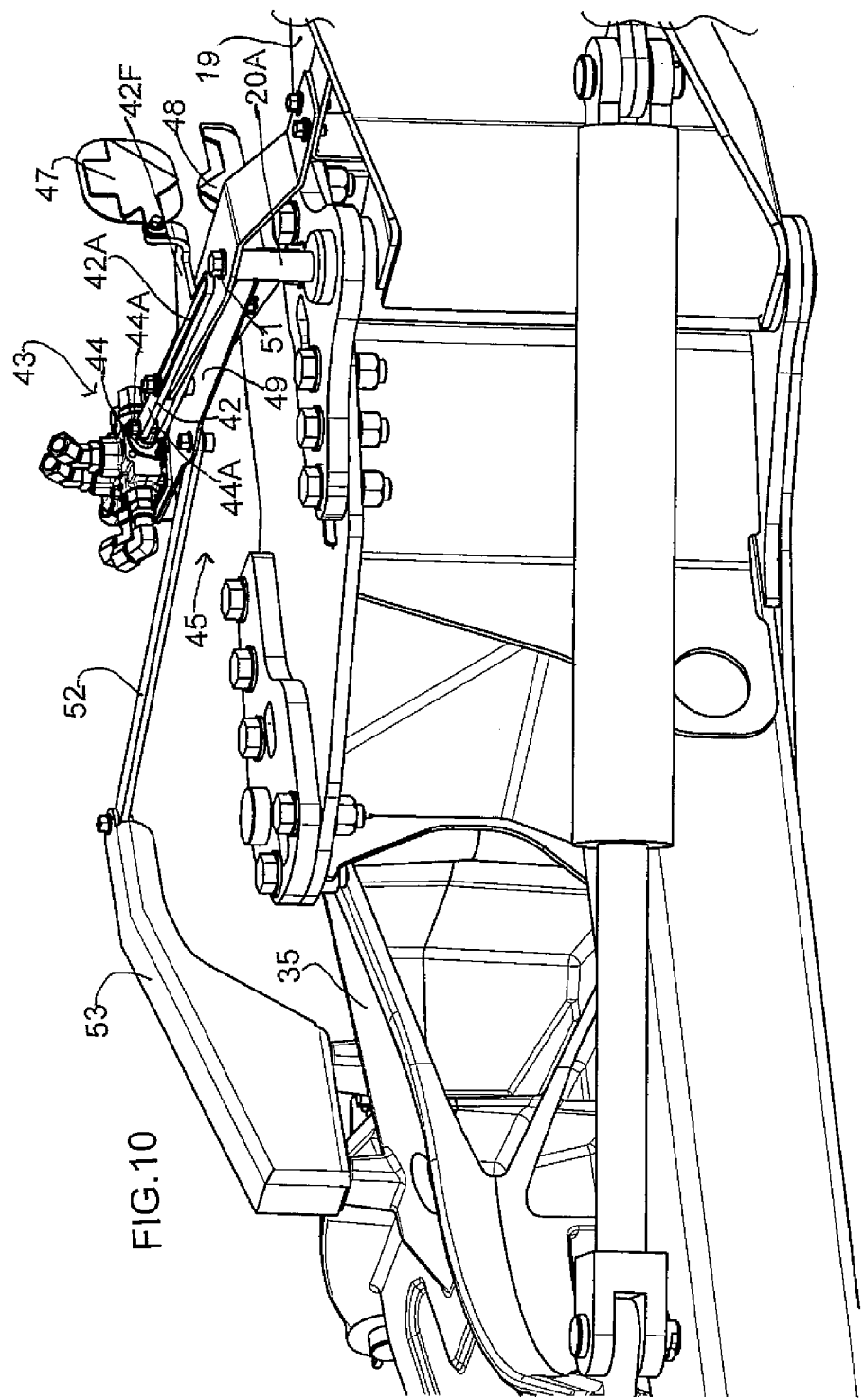
FIG. 10 is a second isometric view of the switching system of FIG. 7 for the circuit of FIG. 6.
Figure 11:
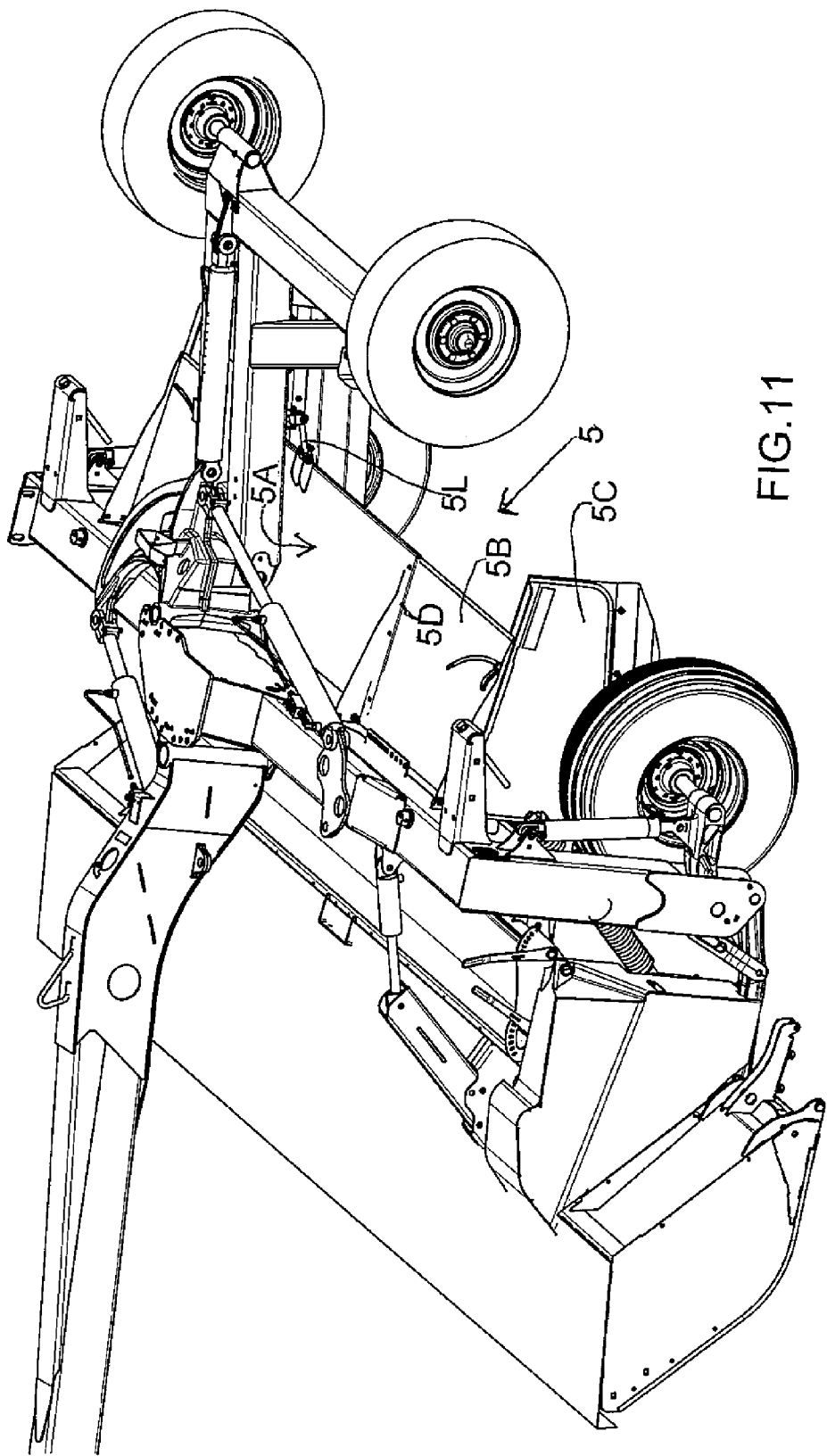
FIG. 11 is an isometric view from the rear and one side of the cutter bar assembly of the crop header of FIG. 7 showing the transport assembly in the field position and showing the cooperation between the transport assembly and the rear shield.
Figure 12:
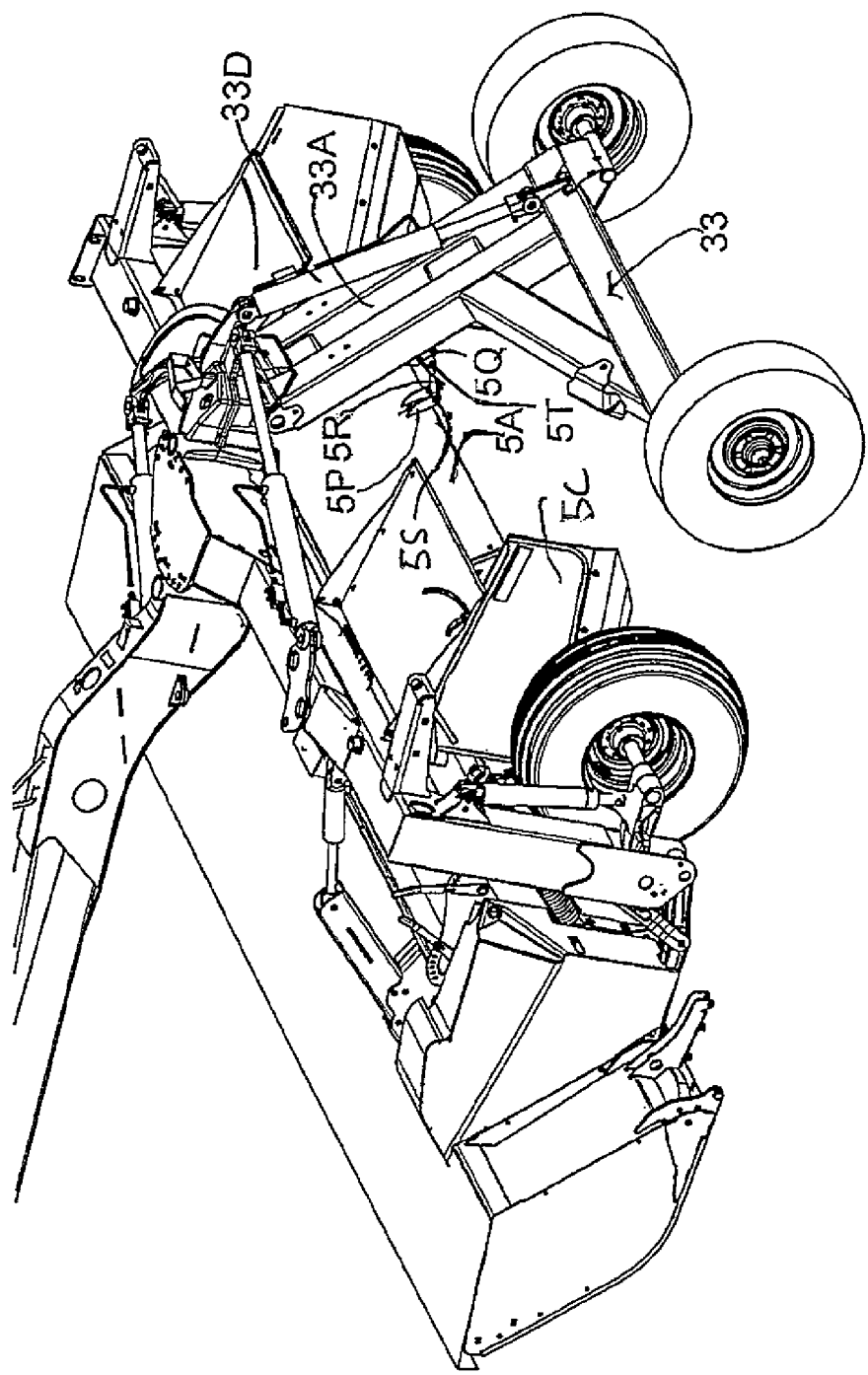
FIG. 12 is an isometric view similar to that of FIG. 11 from the rear and one side showing the transport assembly in the partly deployed position and showing the cooperation between the transport assembly and the rear shield as the transport assembly moves.
Figure 13:
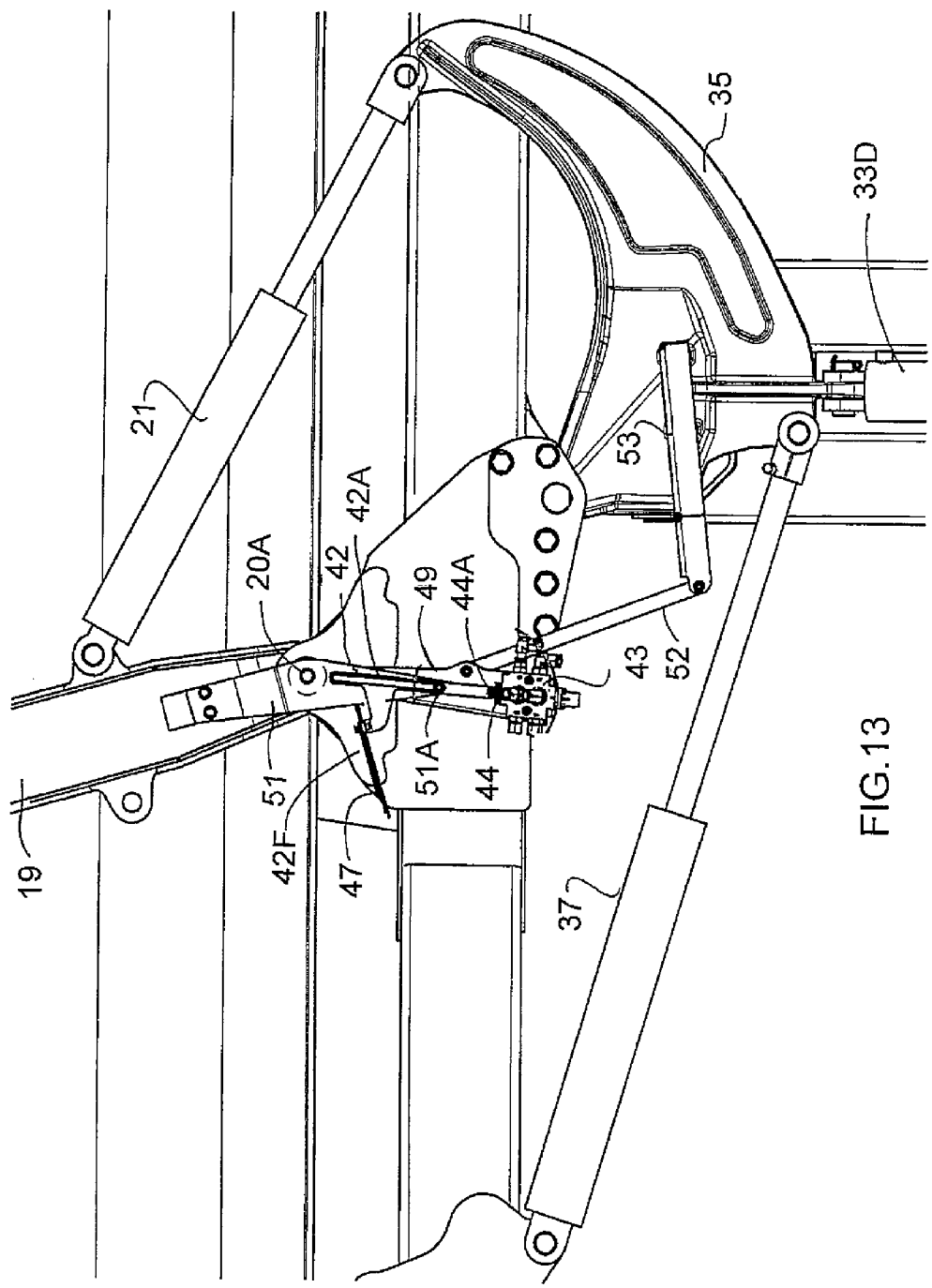
FIG. 13 is a top plan view of the rear end of the hitch connected at the beam of the frame and showing the switch valve and mechanical linkage with the hitch at the predetermined angle which allows operation of the transport system.

Turning now to FIGS. 7, 11 and 12 the shield 5 is shown in more detail and includes a top panel formed by a center section 5A and two side sections 5B, 5E all aligned across the frame and defining common rear edge spaced rearwardly from the beam 12. The sections are separate with each of the inner side edges of the two wing sections having an overlapping edge strip 5D lying on top of an edge portion of the center section. The center section overlaps the sides to tension the entire shield when in field mode thus reducing shield vibration.

Outside the wing sections is provided a pair of depending side panels 5C and 5F which prevent deflection, to the sides. The wing sections and the side panels are fixed to the frame and to each other to remain in fixed position during operation. The center section 5A is connected to the leg 33A of the sub-frame 33 by a link 5L which is attached by a bracket 5P to the upper face of the center section 5A and by a bracket 5Q to the forwardly facing surface of the leg 33A. The link 5L comprises a rigid leg 5R connected to the brackets by universal couplings 5T and 5S.

The provision of the shield cover is an ISO safety standard requirement for machines equipped with flail type conditioner due to higher discharge than roll conditioner. When the header is set in transport mode, the transport frame 33 drops down and swings sideways approximately 90 degrees. The shield panel thus consists of three pieces with center piece attached to the transport frame following it as it goes through the drop down and swing motions. In order for the shield to stay attached to the transport as it swings, the double u-joint link is used as described above.

Figure 16:
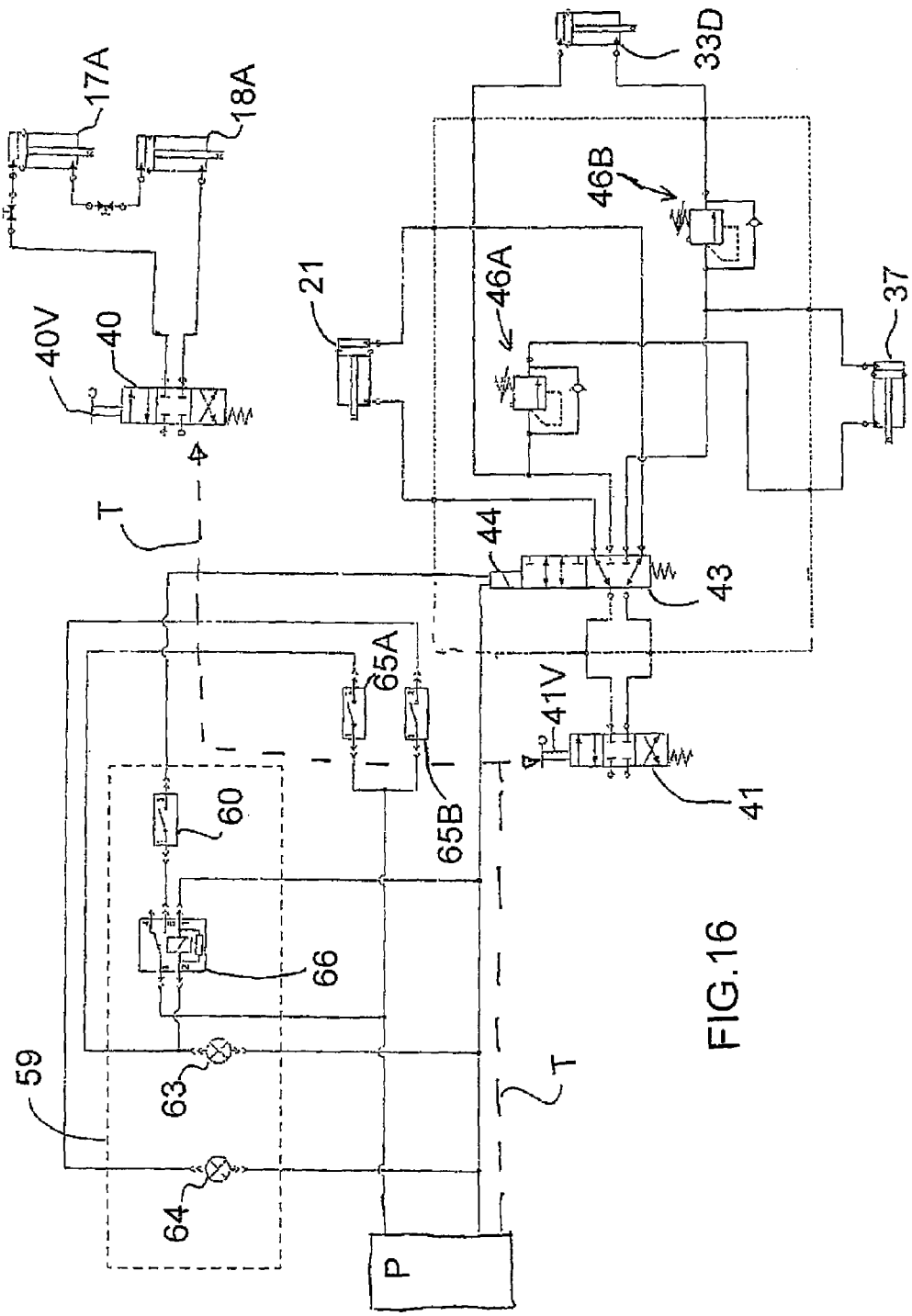
FIG. 16 is schematic diagram showing a second embodiment of the hydraulic circuit for operating the transport system of FIGS. 1 to 5.

Turning now to FIG. 16, there is shown an alternative embodiment for controlling the operation of the hydraulic systems from the supplies 40 and 41 of the tractor in replacement for the circuit of FIG. 6. Many of the components are common and hence use the same reference numbers so that the description thereof will not be repeated here.

In this embodiment the switch 43 is connected to the steering cylinder 21 on one circuit and to the transport cylinders 37 and 33D on the other circuit. In this embodiment there is no mechanical linkage which controls the plunger 44 but instead it is operated by a switch 60 in a control panel 59 manually operable in the tractor cab to supply power from a tractor power supply P to the switch 43. The switch 60 is a two way switch operable between the two modes of hitch steering 61 and transport 62. In order to prevent the tractor operator selecting the modes at the wrong times, there is provided a pair of warning lights 63 and 64 and relays 66 which are operable in response to proximity sensors 65A, 65B which detects angular positions of the hitch arm 19. Thus a plate can be carried on the hitch arm 19 which comes into proximity with the sensor 65A and indicates when the hitch arm is at the predetermined angle defined above by illuminating the light 63 and indicates when the hitch arm is adjacent to the predetermined angle defined above by illuminating the light 64. In this embodiment the arrangement is such that the steering cylinder and transport hydraulics are on the same circuit 41 and the lift cylinders are on the separate circuit 40.

Thus there are two proximity sensors 65A, 65B, one for each indicator light. One sensor and light tells the operator that the header angle relative to the hitch is within range to start the transport deployment. The other sensor and light detects the allowed rotational range of the header when it goes into transport mode. It alerts the operator that transport function is available and keeps the hydraulic switch engaged to supply oil to the transport cylinders for the transport sequence.

The operation is as follows for placing the header in Transport Mode:

1. Fully extended lift cylinders using the supply 40 so that the header is lifted off the ground by extending the wheels to their bottom position.

2. Set the switch 60 to "STEERING" 61. Typically the switch will be in this position during normal use of the header in the field.

3. Operate the supply 41 to move the steering cylinder to rotate header until firstly the green light "TRSP START" 63 is illuminated indicating that the header position relative to the hitch arm is at the required position to engage transport. At this position, the amber light "TRSP AVAIL" 64 should also be illuminated indicating the header position relative to the hitch arm is in the rotational range that the transport is allowed to operate in.

4. Set switch 60 to "TRANSPORT" 62 so that the transport system is actuated by the supply 41 through the valve 43 so as to fully extend the transport deploy cylinder 33D and fully retract the transport swing cylinder 37. In this way the wheels are moved to the transport position and the hitch arm is moved to a position adjacent to but spaced from the latch 12L.

6. Set the switch 60 to "STEERING" 61 so that the valve 43 is spring returned to cause actuation of the steering cylinder 21 so that the hitch steering is operational.

7. Retract steering cylinder until header latch member 19L engages latch 12L on the carrier frame.

8. Retract lift cylinders 17A, 18A using the supply 40 to sit the header cutterbar on the transport leg bracket 33F.

The operation is as follows for placing the header in field Mode:

1. Disengage carrier frame latch to hitch.
2. Fully extend the lift cylinders.
3. Set switch 60 to "TRANSPORT" 62 so as to operate the valve 43 from steering cylinder to transport sequence valve circuit.
4. Fully extend transport swing cylinder and fully retract transport deploy cylinder.
5. Set rocker switch to "STEERING".

The invention claimed is:

1. A pull-type crop engaging machine for towed movement by a tractor comprising:
   a frame mounted on at least one field ground wheel for forward movement during field operation across ground carrying a crop;
   a crop engaging system mounted in a transverse direction across a front of the frame so that the frame carries the crop engaging system in the forward direction generally at right angles to the transverse direction into the crop;
   a hitch arm extending from the frame to a coupling hitch arranged for attachment to a hitch connector of a tractor;
   wherein the hitch arm is mounted at a center position of the frame;
   a mounting connecting the hitch arm to the frame, wherein the mounting is operable to cause movement of the hitch arm to a field position in which the hitch arm is movable by a steering system to different angles of the field position relative to the frame between a first end field position inclined forwardly and outwardly toward a first end of the frame and a second end field position inclined forwardly and outwardly toward a second end of the frame;
   wherein the mounting connecting the hitch arm to the frame is operable to cause movement of the hitch arm to a transport position separate from the field position in which the hitch arm extends from the frame generally in the transverse direction during transport for towing the machine in the transverse direction;
   at least one transport ground wheel attached to the frame for engaging the ground and supporting the frame during transport;
   and a deployment apparatus for deploying movement of said at least one transport ground wheel relative to the frame;
   said deployment apparatus including an actuating apparatus for deploying said movement relative to the frame and components responsive to positioning of the hitch arm at a predetermined intermediate angle of the field position relative to the frame, said intermediate angle being located between said first end field position and said second end field position;
   wherein said actuating apparatus is initiated when said hitch arm is detected by said components to be at said predetermined intermediate angle.

2. The machine according to claim 1 wherein said at least one transport ground wheel is movable by said deployment apparatus between a first position in which the transport ground wheel is raised from the ground for field operation and a second position in which the transport ground wheel is in contact with the ground.

3. The machine according to claim 1 wherein said deployment apparatus is arranged for at least partly simultaneous movement relative to the frame of said at least one transport ground wheel and of said hitch arm to said transport position.

4. The machine according to claim 3 wherein said deployment apparatus is arranged where the intermediate angle or the hitch arm is such that the machine remains balanced on said hitch arm and said at least one field ground wheel, remains balanced on said hitch arm and said at least one transport ground wheel when the transport wheel is deployed with said hitch arm at the intermediate angle and remains balanced on said hitch arm and said at least one transport ground wheel as the hitch arm is moved toward the transport position.

5. The machine according to claim 1 wherein the hitch arm is moved by the deployment apparatus to a predetermined position spaced from the transport position.

6. The machine according to claim 5 wherein the hitch arm is moved from the predetermined position spaced from the transport position to the transport position by the steering system.

7. The machine according to claim 5 wherein there is provided a lift system for raising and lowering the header and wherein the movement by the deployment apparatus of the hitch arm from the predetermined position spaced from the transport position to the transport position acts to deactivate the deployment apparatus and activate the lift system.

8. The machine according to claim 5 wherein the movement by the deployment apparatus of the hitch arm from the predetermined position spaced from the transport position to the transport position acts to activate a latch for the hitch arm to the frame.

9. The machine according to claim 5 wherein there is provided a mechanical stop between the hitch arm and frame and wherein the hitch arm is moved from the predetermined position spaced from the transport position to the transport position by the steering system until hitting the stop.

10. The machine according to claim 9 wherein there is provided a latch between the hitch arm and the frame and wherein the hitch arm is latched to the rear frame at the stop.

11. The machine according to claim 1 wherein there is provided a lift system for raising and lowering the header and there is provided a latch between the hitch arm and the frame and wherein actuation of the latch and the lift system is effected simultaneously so that operating the latch to release the hitch arm causes lifting of the header.

12. The machine according to claim 1 wherein said actuating apparatus is arranged to be initiated only when said hitch arm is within a predetermined range of angles at said intermediate angle.

13. The machine according to claim 1 wherein said components responsive to the positioning of the hitch arm comprise a switch operable to an actuating position of the deployment apparatus when mechanically engaged by an element carried on the hitch arm.

14. The machine according to claim 13 wherein the switch and the hitch arm are arranged so as to maintain the switch in the actuating position as the hitch arm moves from the predetermined intermediate angle toward the transport position.

15. The machine according to claim 14 wherein the switch is movable with the hitch arm so as to maintain the switch in the actuating position as the hitch arm moves from the predetermined intermediate angle toward the transport position.

16. The machine according to claim 13 wherein the switch is a hydraulic valve operable to select one of two hydraulic circuits to enable operation of a hydraulic cylinder of said actuating apparatus.

17. The machine according to claim 16 wherein the switch is a hydraulic valve operable to select operation of said actuating apparatus and disconnect operation of another function of the machine.

18. The machine according to claim 1 wherein said components responsive to positioning of the hitch arm comprise at least one position sensor for detecting when the hitch arm is within a predetermined range of angles at said intermediate angle and for providing an electrical signal in response thereto.

19. The machine according to claim 1 wherein the crop engaging system comprises a cutter bar including a row of cutter disks carried on the cutter bar with each cutter disk being rotatable about a respective upstanding axis.

20. The machine according to claim 1 wherein the frame member is arranged such that said at least one ground transportation wheel is located at a position inward of ends of the crop engaging system.

* * * * *